United States Patent
Ng et al.

(10) Patent No.: US 12,513,270 B2
(45) Date of Patent: Dec. 30, 2025

(54) SYSTEMS AND METHODS FOR FUSING COLOR IMAGE AND NEAR-INFRARED IMAGE

(71) Applicant: INNOPEAK TECHNOLOGY, INC., Palo Alto, CA (US)

(72) Inventors: Kim C. Ng, Palo Alto, CA (US); Jinglin Shen, Palo Alto, CA (US); Chiuman Ho, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 379 days.

(21) Appl. No.: 18/192,281

(22) Filed: Mar. 29, 2023

(65) Prior Publication Data
US 2023/0245289 A1      Aug. 3, 2023

Related U.S. Application Data

(63) Continuation of application No. PCT/US2021/027420, filed on Apr. 15, 2021.
(Continued)

(51) Int. Cl.
*H04N 9/76* (2006.01)
*G06T 3/4053* (2024.01)
(Continued)

(52) U.S. Cl.
CPC ............. *H04N 9/76* (2013.01); *G06T 3/4053* (2013.01); *G06T 5/50* (2013.01); *G06T 5/80* (2024.01);
(Continued)

(58) Field of Classification Search
CPC . H04N 9/76; H04N 9/73; H04N 23/11; H04N 1/40006; G06T 7/30; G06T 7/50;
(Continued)

(56) References Cited

U.S. PATENT DOCUMENTS

| 9,123,141 B2 | 9/2015 | Ng |
| 9,245,201 B1 | 1/2016 | Jin et al. |

(Continued)

FOREIGN PATENT DOCUMENTS

| IN | 202021032940 | 8/2020 | |
| WO | 2020001034 | 1/2020 | |
| WO | WO-2020097130 A1 * | 5/2020 | ............... G06T 3/40 |

OTHER PUBLICATIONS

Menno A. Smeelen, Piet B. W. Schwering, Alexander Toet, and Marco Loog. 2014. Semi-hidden target recognition in gated viewer images fused with thermal IR images. Inf. Fusion 18 (Jul. 2014), 131-147. https://doi.org/10.1016/j.inffus.2013.08.001 (Year: 2014).*

(Continued)

*Primary Examiner* — Devona E Faulk
*Assistant Examiner* — Julie Ko Jeon
(74) *Attorney, Agent, or Firm* — Hodgson Russ LLP

(57) ABSTRACT

A method for image fusion includes the following. One or more geometric characteristics of the NIR image and the RGB image are normalized. The normalized NIR image and the normalized RGB image are converted to a first NIR image and a first RGB image in a radiance domain, respectively. The first NIR image is decomposed to an NIR base portion and an NIR detail portion, and the first RGB image is decomposed to an RGB base portion and an RGB detail portion. The NIR base portion, RGB base portion, NIR detail portion and RGB detail portion are combined using a set of weights. A resulting weighted combination of these base and detail portions is converted from the radiance domain to a fused image in an image domain.

20 Claims, 24 Drawing Sheets

Related U.S. Application Data

(60) Provisional application No. 63/113,144, filed on Nov. 12, 2020, provisional application No. 63/113,161, filed on Nov. 12, 2020, provisional application No. 63/113,151, filed on Nov. 12, 2020, provisional application No. 63/113,145, filed on Nov. 12, 2020, provisional application No. 63/113,152, filed on Nov. 12, 2020, provisional application No. 63/113,139, filed on Nov. 12, 2020, provisional application No. 63/113,155, filed on Nov. 12, 2020.

(51) Int. Cl.
| | |
|---|---|
| G06T 5/50 | (2006.01) |
| G06T 5/80 | (2024.01) |
| G06T 7/30 | (2017.01) |
| G06T 7/50 | (2017.01) |
| G06V 10/143 | (2022.01) |
| G06V 10/56 | (2022.01) |
| G06V 10/82 | (2022.01) |
| H04N 9/73 | (2023.01) |
| H04N 23/11 | (2023.01) |

(52) U.S. Cl.
CPC .............. *G06T 7/30* (2017.01); *G06T 7/50* (2017.01); *G06V 10/143* (2022.01); *G06V 10/56* (2022.01); *G06V 10/82* (2022.01); *H04N 9/73* (2013.01); *H04N 23/11* (2023.01); *G06T 2207/10024* (2013.01); *G06T 2207/10028* (2013.01); *G06T 2207/20208* (2013.01); *G06T 2207/20221* (2013.01)

(58) Field of Classification Search
CPC . G06T 2207/10024; G06T 2207/10028; G06T 2207/20208; G06T 2207/20221; G06T 5/92; G06T 2207/10048; G06T 3/4053; G06T 5/50; G06T 5/80; G06T 7/90; G06T 5/90; G06T 2207/10008; G06T 2207/20021; G06V 10/143; G06V 10/56; G06V 10/82; G06F 18/24133; G06F 18/251
See application file for complete search history.

(56) References Cited

U.S. PATENT DOCUMENTS

| | | | |
|---|---|---|---|
| 9,792,491 | B1 | 10/2017 | Ramaswamy |
| 10,776,982 | B2 | 9/2020 | Risser |
| 10,885,697 | B1 | 1/2021 | Viswanathan et al. |
| 11,257,279 | B2 | 2/2022 | Risser |
| 2004/0075762 | A1 | 4/2004 | Okubo |
| 2004/0165788 | A1 | 8/2004 | Perez et al. |
| 2007/0025720 | A1 | 2/2007 | Raskar et al. |
| 2007/0189615 | A1 | 8/2007 | Liu et al. |
| 2009/0002475 | A1 | 1/2009 | Jelley et al. |
| 2009/0022414 | A1 | 1/2009 | Wei et al. |
| 2009/0060354 | A1 | 3/2009 | Xiao et al. |
| 2009/0274387 | A1 | 11/2009 | Jin |
| 2010/0302376 | A1 | 12/2010 | Boulanger et al. |
| 2012/0274798 | A1 | 11/2012 | Takahashi et al. |
| 2012/0281921 | A1 | 11/2012 | Dowell |
| 2013/0250123 | A1 | 9/2013 | Zhang et al. |
| 2013/0329997 | A1 | 12/2013 | Webb et al. |
| 2014/0267762 | A1* | 9/2014 | Mullis .................. H04N 5/265 348/162 |
| 2014/0307056 | A1* | 10/2014 | Collet Romea .......... H04N 9/75 348/46 |
| 2015/0334315 | A1 | 11/2015 | Teich et al. |
| 2016/0044293 | A1 | 2/2016 | Rivard et al. |
| 2016/0057363 | A1 | 2/2016 | Posa |
| 2016/0307300 | A1 | 10/2016 | Chen et al. |
| 2017/0109870 | A1 | 4/2017 | Park et al. |
| 2017/0132771 | A1 | 5/2017 | Agaian et al. |
| 2017/0213330 | A1 | 7/2017 | Pudipeddi et al. |
| 2017/0359498 | A1 | 12/2017 | Benchemsi et al. |
| 2018/0069996 | A1* | 3/2018 | Shukla .................. H04N 23/71 |
| 2019/0043226 | A1 | 2/2019 | Li et al. |
| 2019/0166292 | A1 | 5/2019 | Grilikhes |
| 2019/0318463 | A1 | 10/2019 | Zhang et al. |
| 2019/0378258 | A1 | 12/2019 | Fan et al. |
| 2020/0020075 | A1 | 1/2020 | Khwaja et al. |
| 2020/0302582 | A1 | 9/2020 | Smirnov et al. |
| 2020/0302584 | A1 | 9/2020 | Zhang et al. |
| 2023/0245289 | A1 | 8/2023 | Ng et al. |
| 2023/0260092 | A1 | 8/2023 | Ng et al. |
| 2023/0267588 | A1 | 8/2023 | Ng et al. |

OTHER PUBLICATIONS

Abhilash Srikantha and Désiré Sidibé. 2012. Ghost detection and removal for high dynamic range images: Recent advances. Image Commun. 27, 6 (Jul. 2012), 650-662. https://doi.org/10.1016/j.image.2012.02.001 (Year: 2012).*
WIPO, International Search Report and Written Opinion for International Application No. PCT/US2021/027419, Jul. 28, 2021.
Srikantha et al., "Ghost Detection and Removal for High Dynamic Range Images: Recent Advances," Signal Processing: Image Communication, 2012, vol. 27.
WIPO, International Search Report and Written Opinion for International Application No. PCT/US2021/027420, Jul. 29, 2021.
WIPO, International Search Report and Written Opinion for International Application No. PCT/US2021/027417, Jul. 21, 2021.
WIPO, International Search Report and Written Opinion for International Application No. PCT/US2021/027414, Sep. 24, 2021.
WIPO, International Search Report and Written Opinion for International Application No. PCT/US2021/027413, Aug. 6, 2021.
WIPO, International Search Report and Written Opinion for International Application No. PCT/US2021/027415, Jul. 20, 2021.
WIPO, International Search Report and Written Opinion for International Application No. PCT/US2021/031521, Aug. 10, 2021.
USPTO, Non-Final Rejection for U.S. Appl. No. 18/131,216, filed Jan. 29, 2025.
WIPO, International Search Report and Written Opinion for International Application No. PCT/US2021/027416, Jul. 21, 2021.
WIPO, International Search Report and Written Opinion for International Application No. PCT/US2021/032486, Aug. 10, 2021.
USPTO, Non-Final Office Action for U.S. Appl. No. 18/191,128, May 21, 2025.
Chen et al., "Region-Based Poisson Blending for Image Repairing," Intelligent Systems and Applications (IntelliSys 2018), Advances in Intelligent Systems and Computing, 2019, vol. 868.
Aktar et al., "Video Haze Removal And Poisson Blending Based Mini-Mosaics For Wide Area Motion Imagery," 2016 IEEE Applied Imagery Pattern Recognition Workshop (AIPR), Aug. 2017.
USPTO, Non-Final Office Action for U.S. Appl. No. 18/295,612, filed May 20, 2025.
USPTO, Final Office Action for U.S. Appl. No. 18/131,216, filed May 14, 2025.

* cited by examiner

Figure 17A  Figure 17B

SYSTEMS AND METHODS FOR FUSING COLOR IMAGE AND NEAR-INFRARED IMAGE

CROSS-REFERENCE TO RELATED APPLICATIONS

This application a continuation of International Application No. PCT/US2021/027420, filed Apr. 15, 2021, which claims priority to the following patent applications, the entire disclosures of which are incorporated by reference herein:
   U.S. Provisional Patent Application No. 63/113,139, filed Nov. 12, 2020;
   U.S. Provisional Patent Application No. 63/113,144, filed Nov. 12, 2020;
   U.S. Provisional Patent Application No. 63/113,145, filed Nov. 12, 2020;
   U.S. Provisional Patent Application No. 63/113,151, filed Nov. 12, 2020;
   U.S. Provisional Patent Application No. 63/113,152, filed Nov. 12, 2020;
   U.S. Provisional Patent Application No. 63/113,155, filed Nov. 12, 2020; and
   U.S. Provisional Patent Application No. 63/113,161, filed Nov. 12, 2020.

TECHNICAL FIELD

The present application generally relates to image processing, particularly to methods and systems for fusing images that are captured of a scene by two distinct sensor modalities (visible light and near-infrared image sensors) of a single camera or two distinct cameras in a synchronous manner.

BACKGROUND

Image fusion techniques are applied to combine information from different image sources into a single image. Resulting images contain more information than that provided by any single image source. The different image sources often correspond to different sensory modalities located in a scene to provide different types of information (e.g., colors, brightness, and details) for image fusion. For example, color images are fused with near-infrared (NIR) images, which enhance details in the color images while substantially preserving color and brightness information of the color images. Particularly, NIR light can travel through fog, smog, or haze better than visible light, allowing some dehazing algorithms to be established based on a combination of the NIR and color images. However, color in resulting images that are fused from the color and NIR images can deviate from true color of the original color images. It would be beneficial to have a mechanism to implement image fusion effectively and improve quality of images resulting from image fusion.

SUMMARY

In one aspect, an image fusion method is provided. The image fusion method includes obtaining a near infrared (NIR) image and an RGB image captured simultaneously in a scene, normalizing one or more geometric characteristics of the NIR image and the RGB image, and converting the normalized NIR image to a first NIR image and converting the normalized RGB image to a first RGB image in a radiance domain. The image fusion method further includes decomposing the first NIR image to an NIR base portion and an NIR detail portion, decomposing the first RGB image to an RGB base portion and an RGB detail portion, generating a weighted combination of the NIR base portion, RGB base portion, NIR detail portion and RGB detail portion using a set of weights, and converting the weighted combination in the radiance domain to a first fused image in an image domain.

In another aspect, an image fusion method is provided. The image fusion method includes obtaining a first image and a second image captured simultaneously in a scene by two distinct image sensors: normalizing one or more geometric characteristics of the first image and the second image: converting the normalized first image to a third image in a radiance domain and converting the normalized second image to a fourth image in a radiance domain: decomposing the third image to a first base portion and a first detail portion, and decomposing the fourth image to a second base portion and a second detail portion; generating a weighted combination of the first base portion, first base portion, second detail portion and second detail portion using a set of weights; and converting the weighted combination in the radiance domain to a first fused image in an image domain.

According to another aspect of the present application, a computer system includes one or more processors and a memory having instructions stored thereon, which when executed by the one or more processors cause the processors to perform the method as described above.

According to another aspect of the present application, a non-transitory computer-readable storage medium has instructions stored thereon which, when executed by one or more processors, cause the processors to perform the method as described above.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles.

FIGS. 17A-17D are an RGB image, an NIR monochrome image, a fused image combining the RGB image and NIR monochrome image, and a final image generated by the framework shown in FIG. 16 in accordance with some embodiments.

Like reference numerals refer to corresponding parts throughout the several views of the drawings.

DETAILED DESCRIPTION

Figure 1:
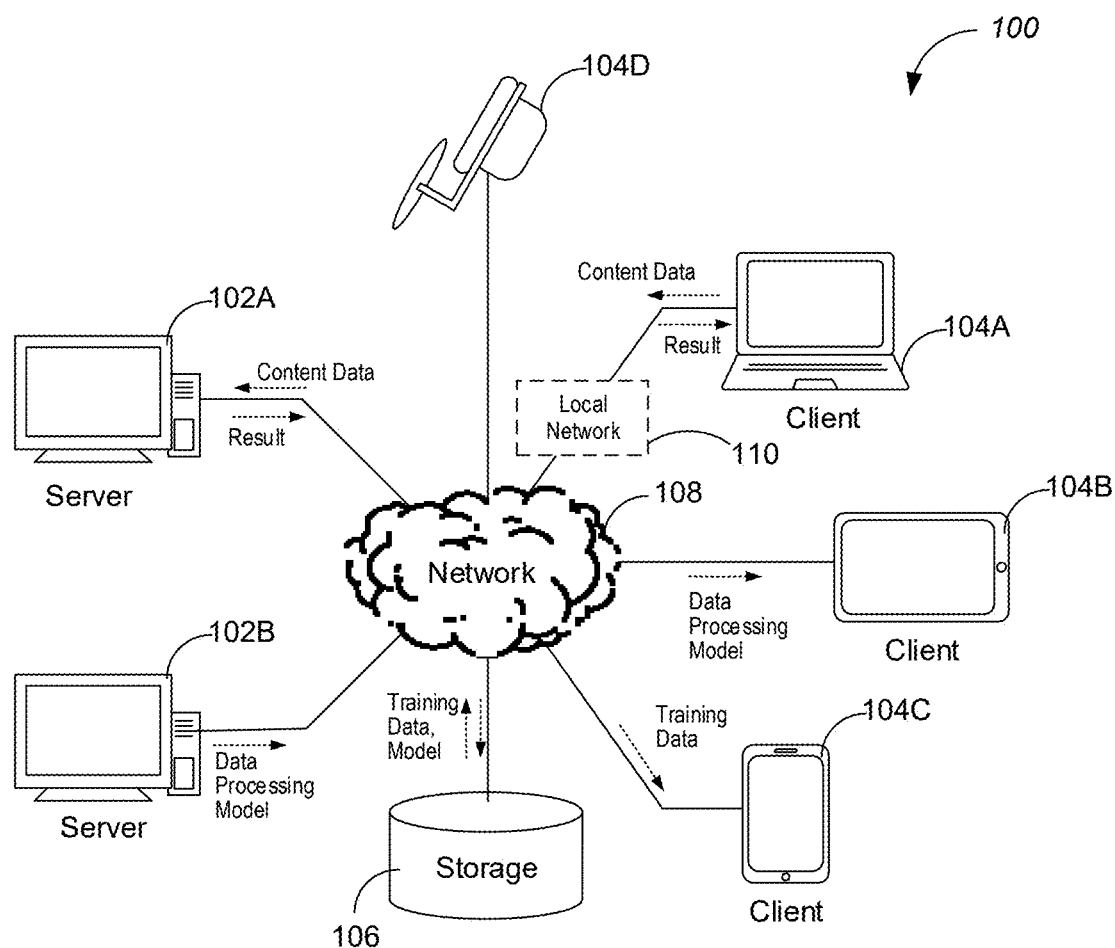
FIG. 1 is an example data processing environment having one or more servers communicatively coupled to one or more client devices, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

The present application describes embodiments related to combining information of a plurality of images captured by different image sensor modalities, e.g., a true color image (also called an RGB image) and a corresponding NIR image. In an example, the RGB and NIR images can be decomposed into detail portions and base portions and are fused in a radiance domain using different weights. Prior to this fusion process, the RGB and NIR images can be aligned locally and iteratively using an image registration operation. Radiances of the RGB and NIR images may have different dynamic ranges and can be normalized via a radiance mapping function. For image fusion, luminance components of the RGB and NIR images may be combined based on an infrared emission strength, and further fused with color components of the RGB image. A fused image can also be adjusted with reference to one of a plurality of color channels of the fused image. Further, in some embodiments, a base component of the RGB image and a detail component of the fused image are extracted and combined to improve the quality of image fusion. When one or more hazy zones are detected in the fused images, a predefined portion of each hazy zone is saturated to suppress a hazy effect in the fused image. By these means, the image fusion can be implemented effectively, thereby providing images with better image qualities (e.g., having more details, better color fidelity, and/or a lower hazy level).

In one aspect, another image fusion method is implemented at a computer system (e.g., a server, an electronic device having a camera, or both of them) having one or more processors and memory. The image fusion method includes obtaining two images captured simultaneously (e.g., by different image sensors of the same camera or two distinct cameras), converting the two images in an image domain to a first image and a second image in a radiance domain, and determining that the first image has a first radiance covering a first dynamic range and that the second image has a second radiance covering a second dynamic range. The image fusion method further includes in accordance with a determination that the first dynamic range is greater than the second dynamic range: determining a radiance mapping function between on the first and second dynamic ranges, mapping the second radiance of the second image from the second dynamic range to the first dynamic range according to the mapping function, and combining the first radiance of the first image and the mapped second radiance of the second image to generate a fused radiance image. The image fusion method further includes converting the fused radiance image in the radiance domain to a fused pixel image in the image domain.

In another aspect, an image processing method is implemented for correcting image colors at a computer system (e.g., a server, an electronic device having a camera, or both of them) having one or more processors and memory. The image processing method includes obtaining a first image and a second image captured simultaneously for a scene (e.g., by different image sensors of the same camera or two distinct cameras) and fusing the first and second images to generate a fused image. The first and fused images correspond to a plurality of color channels in a color space. The image processing method further includes selecting a first color channel from the plurality of color channels as an anchor channel and determining an anchor ratio between a first color information item and a second color information item. The first and second color information items correspond to the first color channel of the first and fused images, respectively. The image processing method includes for each of one or more second color channels distinct from the first color channel, determining a respective corrected color information item based on the anchor ratio and at least a respective third information item corresponding to the respective second color channel of the first image. The image processing method includes combining the second color information item of the first color channel of the fused image and the respective corrected color information item of each of the one or more second color channels to generate a final image in the color space.

In another aspect, an image registration method is implemented at a computer system (e.g., a server, an electronic device having a camera, or both of them) having one or more processors and memory. The image registration method includes obtaining a first image and a second image of a scene, aligning the first and second images globally to generate a third image corresponding to the first image and a fourth image corresponding to the second image and aligned with the third image, and dividing each of the third and fourth images to a respective plurality of grid cells including a respective first grid cell. The respective first grid cells of the third and fourth images are aligned with each other. The image registration method further includes for the respective first grid cell of each of the third and fourth images, identifying one or more first feature points; and in accordance with a determination that a grid ghosting level of the respective first grid cell is greater than a grid ghosting threshold, dividing the respective first grid cell to a set of sub-cells and updating the one or more first feature points in the set of sub-cells. The image registration method further includes re-aligning the first and second images based on the one or more updated first feature points of the respective first grid cell of each of the third and fourth images.

In yet another aspect, an image processing method is implemented at a computer system (e.g., a server, an electronic device having a camera, or both of them) having one or more processors and memory. The image processing method includes obtaining a first image and a second image of a scene, extracting a first luminance component and a first color component from the first image, extracting a second luminance component from the second image, determining an infrared emission strength based on the first and second luminance components, combining the first and second luminance components based on the infrared emission strength to obtain a combined luminance component, and combining the combined luminance component with the first color component to obtain a fused image.

In yet another aspect, an image processing method is implemented at a computer system (e.g., a server, an electronic device having a camera, or both of them) having one or more processors and memory. The image processing method includes obtaining a first image and a second image of a scene, generating a fused image that combines the first and second images, decomposing the fused image to a fusion base component and a fusion detail component, decomposing the first image to a first base component and a first detail component, and combining the first base component of the first image and the fusion detail component of the fused image to a final image.

In yet another aspect, an image processing method is implemented at a computer system (e.g., a server, an electronic device having a camera, or both of them) having one or more processors and memory. The image processing method includes obtaining an input image, detecting one or more hazy zones in the input image, identifying a predefined portion of pixels having minimum pixel values in each of the one or more hazy zones, modifying the input image to a first image by locally saturating the predefined portion of pixels in each of the one or more hazy zones to a low-end pixel value limit, and blending the input image and the first image to form a target image.

According to another aspect of the present application, a computer system includes one or more processing units, memory and a plurality of programs stored in the memory. The programs, when executed by the one or more processing units, cause the one or more processing units to perform the methods for processing images as described above.

According to another aspect of the present application, a non-transitory computer readable storage medium stores a plurality of programs for execution by a computer system having one or more processing units. The programs, when executed by the one or more processing units, cause the one or more processing units to perform the methods for processing images as described above.

The present application is directed to combining information of a plurality of images by different mechanisms and applying additional pre-processing and post-processing to improve an image quality of a resulting fused image. In some embodiments, an RGB image and an NIR image can be decomposed into detail portions and base portions and are fused in a radiance domain using different weights. In some embodiments, radiances of the RGB and NIR images may have different dynamic ranges and can be normalized via a radiance mapping function. For image fusion, in some embodiments, luminance components of the RGB and NIR images may be combined based on an infrared emission strength, and further fused with color components of the RGB image. In some embodiments, a fused image can also be adjusted with reference to one of a plurality of color channels of the fused image. In some embodiments, a base component of the RGB image and a detail component of the fused image are extracted and combined to improve the quality of image fusion. Prior to any fusion process, the RGB and NIR images can be aligned locally and iteratively using an image registration operation. Further, when one or more hazy zones are detected in an input RGB image or a fused image, white balance is adjusted locally by saturating a predefined portion of each hazy zone to suppress a hazy effect in the RGB or fused image. By these means, the image fusion can be implemented effectively, thereby providing images with better image qualities (e.g., having more details, better color fidelity, and/or a lower hazy level).

FIG. 1 is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, or intelligent, multi-sensing, network-connected home devices (e.g., a surveillance camera 104D). Each client device 104 can collect data or user inputs, executes user applications, or present outputs on its user interface. The collected data or user inputs can be processed locally at the client device 104 and/or remotely by the server(s) 102. The one or more servers 102 provides system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102. In some embodiments, the one or more servers 102 can implement data processing tasks that cannot be or are preferably not completed locally by the client devices 104. For example, the client devices 104 include a game console that executes an interactive online gaming application. The game console receives a user instruction and sends it to a game server 102 with user data. The game server 102 generates a stream of video data based on the user instruction and user data and providing the stream of video data for concurrent display on the game console and other client devices 104 that are engaged in the same game session with the game console. In another example, the client devices 104 include a mobile phone 104C and a networked surveillance camera 104D. The camera 104D collects video data and streams the video data to a surveillance camera server 102 in real time. While the video data is optionally pre-processed on the camera 104D, the surveillance camera server 102 processes the video data to identify motion or audio events in the video data and share information of these events with the mobile phone 104C, thereby allowing a user of the mobile phone 104C to monitor the events occurring near the networked surveillance camera 104D in real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

In some embodiments, deep learning techniques are applied in the data processing environment 100 to process content data (e.g., video, image, audio, or textual data) obtained by an application executed at a client device 104 to identify information contained in the content data, match the content data with other data, categorize the content data, or synthesize related content data. In these deep learning techniques, data processing models are created based on one or more neural networks to process the content data. These data processing models are trained with training data before they are applied to process the content data. In some embodiments, both model training and data processing are implemented locally at each individual client device 104 (e.g., the client device 104C). The client device 104C obtains the training data from the one or more servers 102 or storage 106 and applies the training data to train the data processing models. Subsequently to model training, the client device 104C obtains the content data (e.g., captures video data via an internal camera) and processes the content data using the training data processing models locally. Alternatively, in some embodiments, both model training and data processing are implemented remotely at a server 102 (e.g., the server 102A) associated with one or more client devices 104 (e.g. the client devices 104A and 104D). The server 102A obtains the training data from itself, another server 102 or the storage 106 and applies the training data to train the data processing models. The client device 104A or 104D obtains the content data and sends the content data to the server 102A (e.g., in a user application) for data processing using the trained data processing models. The same client device or a distinct client device 104A receives data processing results from the server 102A, and presents the results on a user interface (e.g., associated with the user application). The client device 104A or 104D itself implements no or little data processing on the content data prior to sending them to the server 102A. Additionally, in some embodiments, data processing is implemented locally at a client device 104 (e.g., the client device 104B), while model training is implemented remotely at a server 102 (e.g., the server 102B) associated with the client device 104B. The server 102B obtains the training data from itself, another server 102 or the storage 106 and applies the training data to train the data processing models. The trained data processing models are optionally stored in the server 102B or storage 106. The client device 104B imports the trained data processing models from the server 102B or storage 106, processes the content data using the data processing models, and generates data processing results to be presented on a user interface locally.

In various embodiments of this application, distinct images are captured by a camera (e.g., a standalone surveillance camera 104D or an integrated camera of a client device 104A), and processed in the same camera, the client device 104A containing the camera, a server 102, or a distinct client device 104. Optionally, deep learning techniques are trained or applied for the purposes of processing the images. In an example, a near infrared (NIR) image and an RGB image are captured by the camera 104D or the camera of the client device 104A. After obtaining the NIR and RGB image, the same camera 104D, client device 104A containing the camera, server 102, distinct client device 104 or a combination of them normalizes the NIR and RGB images, converts the images to a radiance domain, decomposes the images to different portions, combines the decomposed portions, tunes color of a fused image, and/or dehazes the fused image, optionally using a deep learning technique. The fused image can be reviewed on the client device 104A containing the camera or the distinct client device 104.

Figure 2:
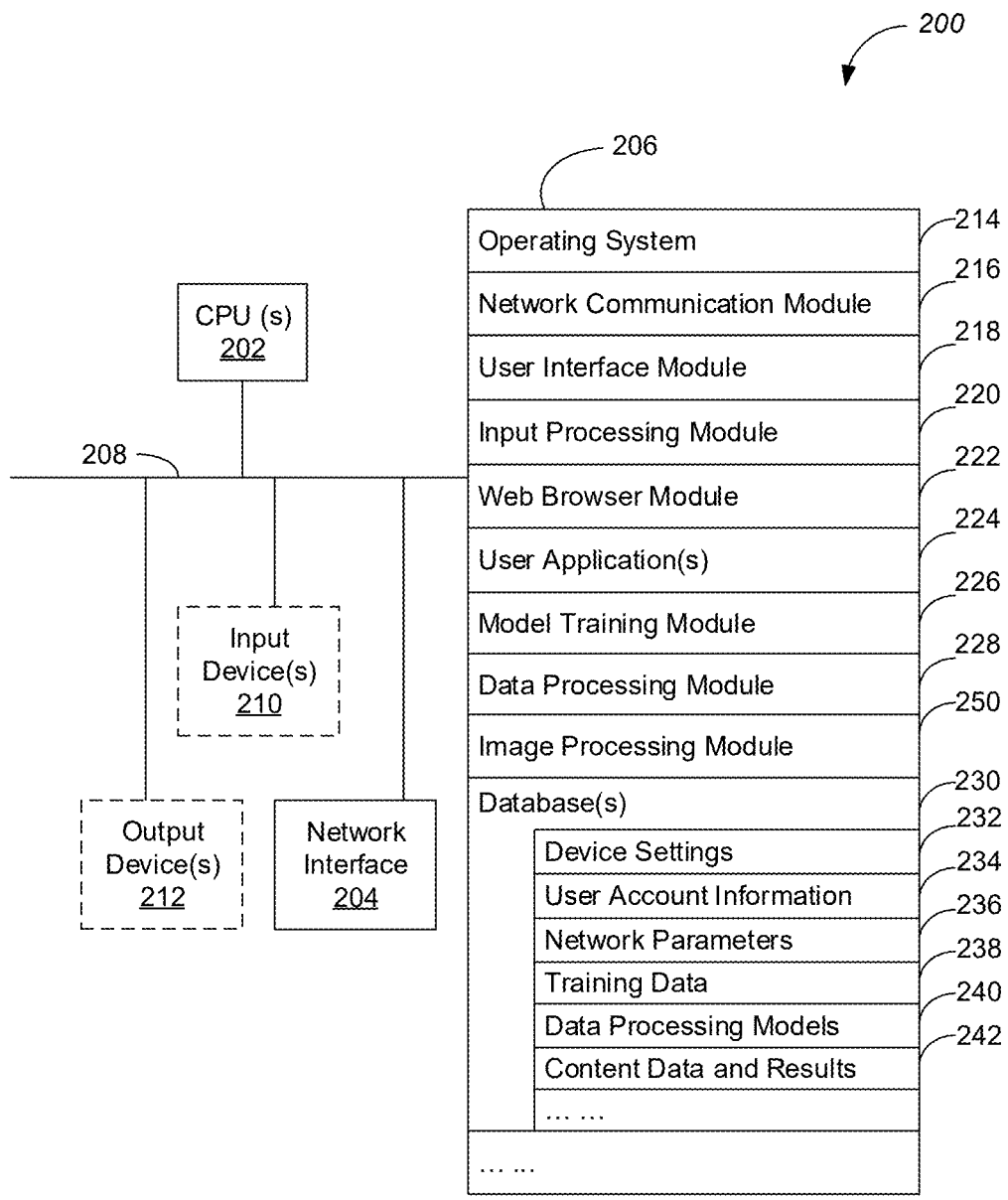
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104, a storage 106, or a combination thereof. The data processing system 200, typically, includes one or more processing units (CPUs) 202, one or more network interfaces 204, memory 206, and one or more communication buses 208 for interconnecting these components (sometimes called a chipset). The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the keyboard. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;
- One or more user applications 224 for execution by the data processing system 200 (e.g., games, social network applications, smart home applications, and/or other web or non-web based applications for controlling another electronic device and reviewing data captured by such devices);
- Model training module 226 for receiving training data and establishing a data processing model for processing content data (e.g., video, image, audio, or textual data) to be collected or obtained by a client device 104;
- Data processing module 228 for processing content data using data processing models 240, thereby identifying information contained in the content data, matching the content data with other data, categorizing the content data, enhancing the content data, or synthesizing related content data, where in some embodiments, the data processing module 228 is associated with one of the user applications 224 to process the content data in response to a user instruction received from the user application 224;
- Image processing module 250 for normalizing an NIR image and an RGB image, converting the images to a radiance domain, decomposing the images to different portions, combining the decomposed portions, and/or tuning a fused image, where in some embodiments, one or more image processing operations involve deep learning techniques and are implemented jointly with the model training module 226 or data processing module 228; and
- One or more databases 230 for storing at least data including one or more of:
    - Device settings 232 including common device settings (e.g., service tier, device model, storage capacity, processing capabilities, communication capabilities, Camera Response Functions (CRFs), etc.) of the one or more servers 102 or client devices 104;
    - User account information 234 for the one or more user applications 224, e.g., user names, security questions, account history data, user preferences, and predefined account settings;
    - Network parameters 236 for the one or more communication networks 108, e.g., IP address, subnet mask, default gateway, DNS server and host name;
    - Training data 238 for training one or more data processing models 240;
    - Data processing model(s) 240 for processing content data (e.g., video, image, audio, or textual data) using deep learning techniques; and
    - Content data and results 242 that are obtained by and outputted to the client device 104 of the data processing system 200, respectively, where the content data is processed locally at a client device 104 or remotely at a server 102 or a distinct client device 104 to provide the associated results 242 to be presented on the same or distinct client device 104, and examples of the content data and results 242 include RGB images, NIR images, fused images, and related data (e.g., depth images, infrared emission strengths, feature points of the RGB and NIR images, fusion weights, and a predefined percentage and a low-end pixel value end set for localized auto white balance adjustment, etc.).

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240) are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 3:
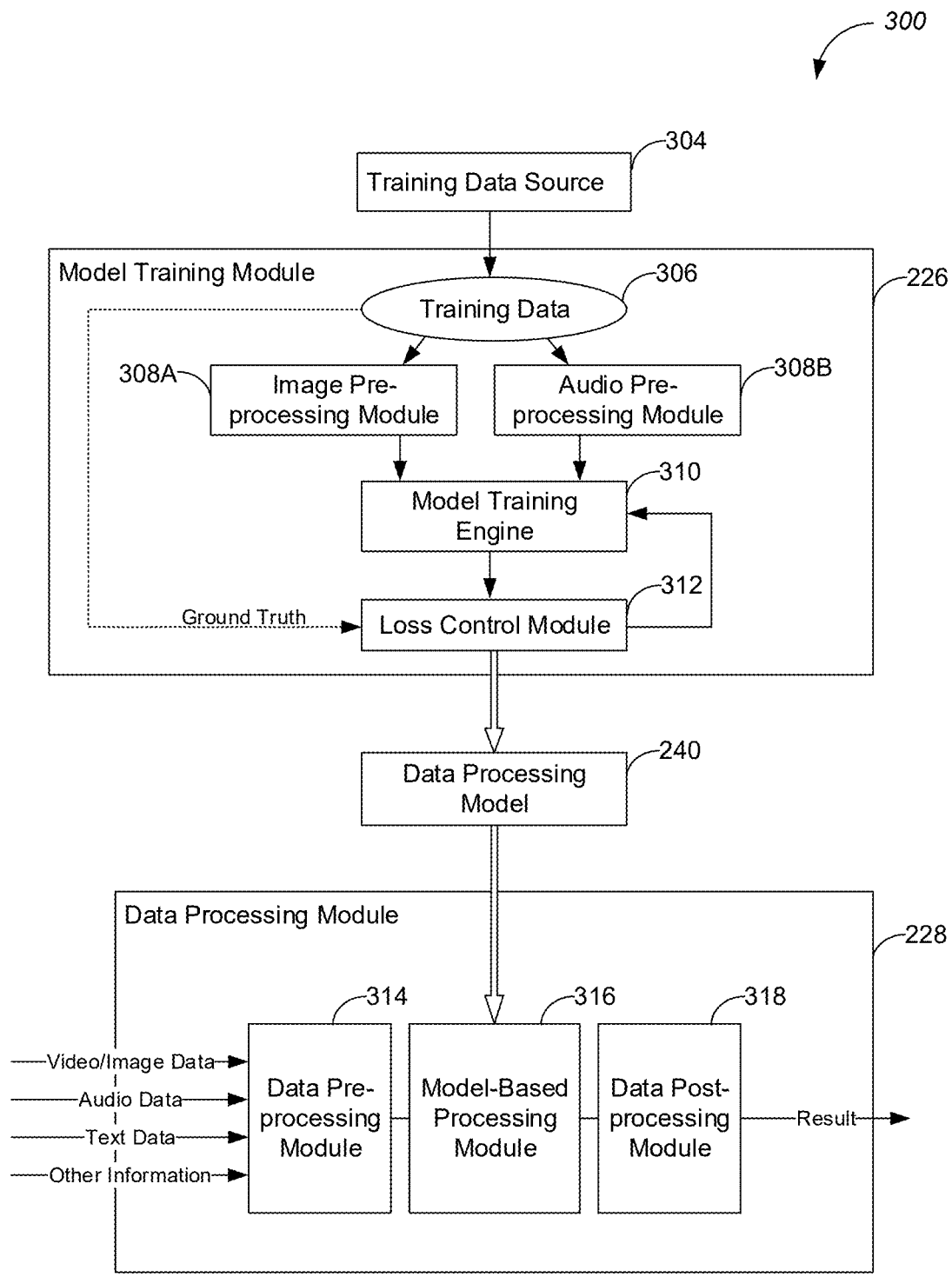
FIG. 3 is an example data processing environment for training and applying a neural network based (NN-based) data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct form the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so is a data pre-processing module 308 applied to process the training data 306 consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240) to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing modules 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240). In some embodiments, the processed content data is further processed by the data post-processing module 318 to present the processed content data in a preferred format or to provide other related information that can be derived from the processed content data.

Figure 4A:
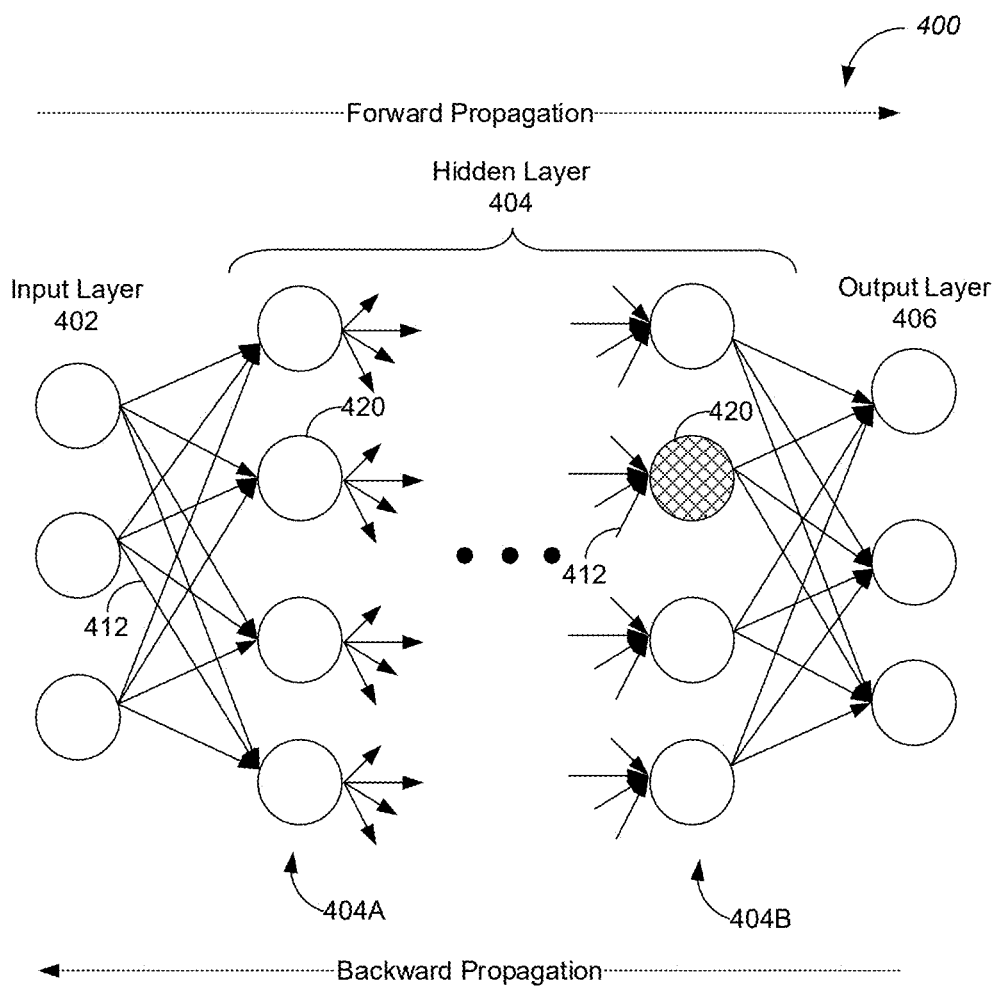
FIG. 4A is an example neural network applied to process content data in an NN-based data processing model, in accordance with some embodiments.
Figure 4B:
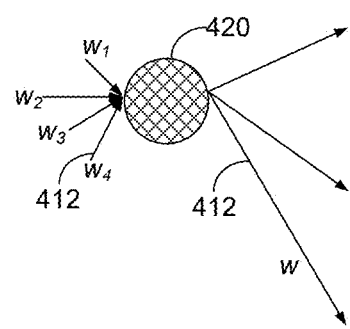
FIG. 4B is an example node in the neural network, in accordance with some embodiments.

FIG. 4A is an example neural network (NN) 400 applied to process content data in an NN-based data processing model 240, in accordance with some embodiments, and FIG. 4B is an example node 420 in the neural network (NN) 400, in accordance with some embodiments. The data processing model 240 is established based on the neural network 400. A corresponding model-based processing module 316 applies the data processing model 240) including the neural network 400 to process content data that has been converted to a predefined content format. The neural network 400 includes a collection of nodes 420 that are connected by links 412. Each node 420 receives one or more node inputs and applies a propagation function to generate a node output from the one or more node inputs. As the node output is provided via one or more links 412 to one or more other nodes 420, a weight w associated with each link 412 is applied to the node output. Likewise, the one or more node inputs are combined based on corresponding weights $w_1$, $w_2$, $w_3$, and $w_4$ according to the propagation function. In an example, the propagation function is a product of a non-linear activation function and a linear weighted combination of the one or more node inputs.

The collection of nodes 420 is organized into one or more layers in the neural network 400. Optionally, the one or more layers includes a single layer acting as both an input layer and an output layer. Optionally, the one or more layers includes an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued activation. Examples of the RNN include, but are not limited to, a long short-term memory (LSTM) network, a fully recurrent network, an Elman network, a Jordan network, a Hopfield network, a bidirectional associative memory (BAM network), an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_i$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

System Methodology for Fusing Color Image and Near-Infrared Image

Image Fusion is to combine information from different image sources into a compact form of image that contains more information than any single source image. In some embodiments, image fusion is based on different sensory modalities of the same camera or two distinct cameras, and the different sensory modalities contain different types of information, including color, brightness, and detail information. For example, color images (RGB) are fused with NIR images, e.g., using deep learning techniques, to incorporate details of the NIR images into the color images while preserving the color and brightness information of the color images. A fused image incorporates more details from a corresponding NIR image and has a similar RGB look to a corresponding color image. Various embodiments of this application can achieve a high dynamic range (HDR) in a radiance domain, optimize amount of details incorporated from the NIR images, prevent a see-through effect, preserve color of the color images, and dehaze the color or fused images. As such, these embodiments can be widely used for different applications including, but not limited to, autonomous driving and visual surveillance applications.

Figure 5:
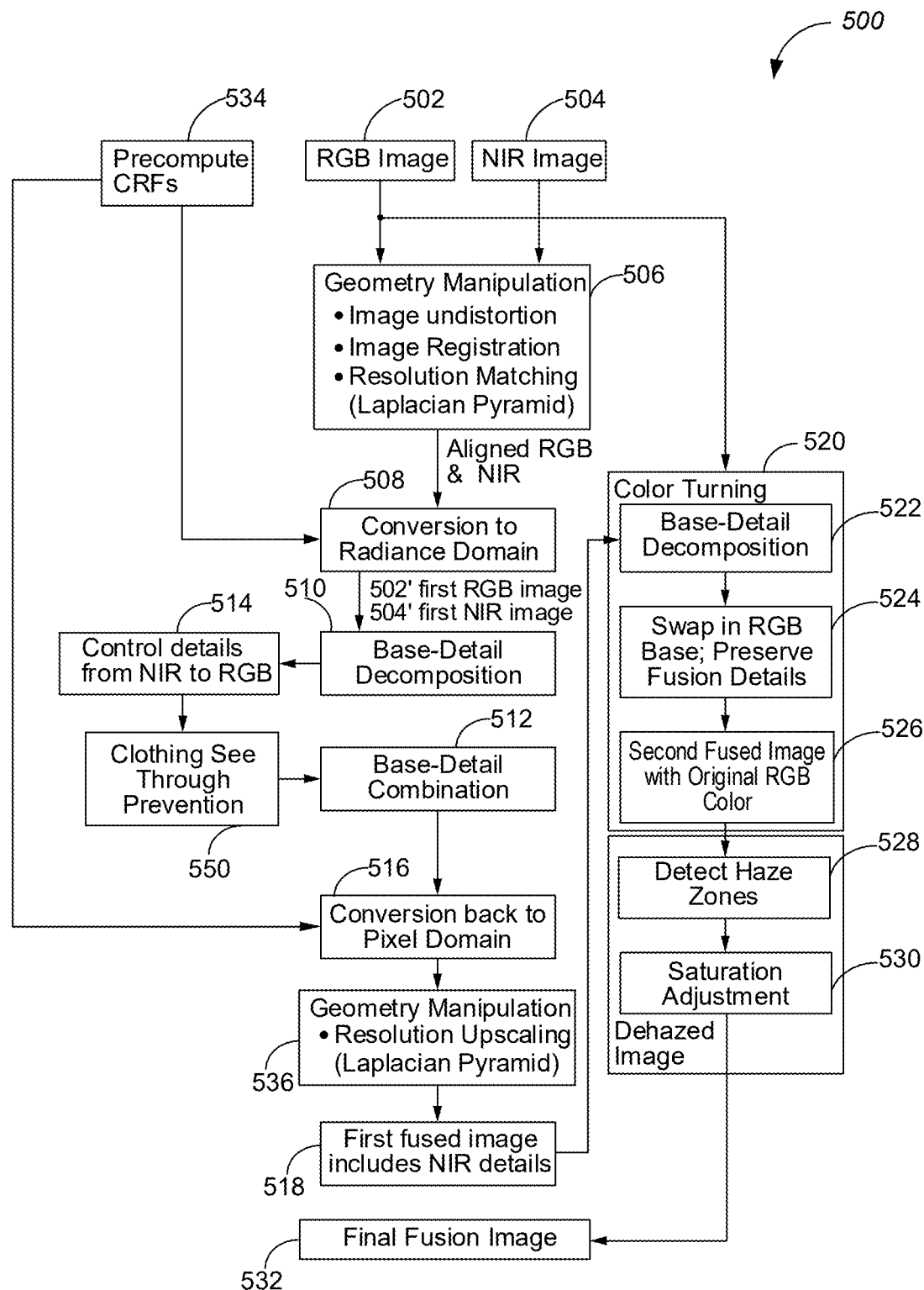
FIG. 5 is an example framework of fusing an RGB image and an NIR image, in accordance with some embodiments.

FIG. 5 is an example framework 500 of fusing an RGB image 502 and an NIR image 504, in accordance with some embodiments. The RGB image 502 and NIR image 504 are captured simultaneously in a scene by a camera or two distinct cameras (specifically, by an NIR image sensor and a visible light image sensor of the same camera or two distinct cameras). One or more geometric characteristics of the NIR image and the RGB image are manipulated (506), e.g., to reduce a distortion level of at least a portion of the RGB and NIR images 502 and 504, to transform the RGB and NIR image 502 and 504 into the same coordinate system associated with the scene. In some embodiments, a field of the view of the NIR image sensor is substantially identical to that of the visible light image sensor. Alternatively, in some embodiments, the fields of view of the NIR and visible light image sensors are different, and at least one of the NIR and RGB images is cropped to match the fields of view. Matching resolution are desirable, but not necessary. In some embodiments, the resolution of at least one of the RGB and NIR images 502 and 504 is adjusted to match their resolutions, e.g., using a Laplacian pyramid.

The normalized RGB image 502 and NIR image 504 are converted (508) to a RGB image 502' and a first NIR image 504' in a radiance domain, respectively. In the radiance domain, the first NIR image 504' is decomposed (510) to an NIR base portion and an NIR detail portion, and the first RGB image 502' is decomposed (510) to an RGB base portion and an RGB detail portion. In an example, a guided image filter is applied to decompose the first RGB image 502' and/or the first NIR image 504'. A weighted combination 512 of the NIR base portion, RGB base portion, NIR detail portion and RGB detail portion is generated using a set of weights. Each weight is manipulated to control how much of a respective portion is incorporated into the combination. Particularly, a weight corresponding to the NIR base portion is controlled (514) to determine how much of detail information of the first NIR image 514' is utilized. The weighted combination 512 in the radiance domain is converted (516) to a first fused image 518 in an image domain (also called "pixel domain"). This first fused image 518 is optionally upscaled to a higher resolution of the RGB and NIR images 502 and 504 using a Laplacian pyramid. By these means, the first fused image 518 maintains original color information of the RGB image 502 while incorporating details from the NIR image 504.

In some embodiments, the set of weights used to obtain the weighted combination 512 includes a first weight, a second weight, a third weight and a fourth weight corresponding to the NIR base portion, NIR detail portion, RGB base portion and RGB detail portion, respectively. The second weight corresponding to the NIR detail portion is greater than the fourth weight corresponding to the RGB detail portion, thereby allowing more details of the NIR image 504 to be incorporated into the RGB image 502. Further, in some embodiments, the first weight corresponding to the NIR base portion is less than the third weight corresponding to the RGB base portion. Additionally, in some embodiments not shown in FIG. 5, the first NIR image 504' includes an NIR luminance component, and the first RGB image 502' includes an RGB luminance component. An infrared emission strength is determined based on the NIR and RGB luminance components. At least one of the set of weights is generated based on the infrared emission strength, such that the NIR and RGB luminance components are combined based on the infrared emission strength. More details on adjusting weights based on the infrared emission strength are discussed below with reference to FIG. 14.

In some embodiments, a Camera Response Function (CRF) is computed (534) for the camera(s). The CRF optionally includes separate CRF representations for the RGB image sensor and the NIR image sensor. The CRF representations are applied to convert the RGB and NIR images 502 and 504 to the radiance domain and convert the weighted combination 512 back to the image domain after image fusion. Specifically, the normalized RGB and NIR images are converted to the first RGB and NIR images 502' and 504' in accordance with the CRF of the camera, and the weighted combination 512 is converted to the first fused image 518 in accordance with the CRF of the camera(s).

In some embodiments, before the first RGB and NIR images 502' and 504 are decomposed, their radiance levels are normalized. Specifically, it is determined that the first RGB image 502' has a first radiance covering a first dynamic range and that the first NIR image 504' has a second radiance covering a second dynamic range. In accordance with a determination that the first dynamic range is greater than the second dynamic range, the first NIR image 504 is modified, i.e., the second radiance of the first NIR image 504' is mapped to the first dynamic range. Conversely, in accordance with a determination that the first dynamic range is less than the second dynamic range, the first RGB image 502' is modified. i.e., the first radiance of the first RGB image 502' is mapped to the second dynamic range. More details on normalizing the radiances of the RGB and NIR images are discussed below with reference to FIG. 6.

In some embodiments, a weight in the set of weights (e.g., the weight of the NIR detail portion) corresponds to a respective weight map configured to control different regions separately. The NIR image 504 includes a portion having details that need to be hidden, and the weight corresponding to the NIR detail portion includes one or more weight factors corresponding to the portion of the NIR detail portion. An image depth of the region of the first NIR image is determined. The one or more weight factors are determined based on the image depth of the region of the first NIR image. The one or more weight factors corresponding to the region of the first NIR image are less than a remainder of the second weight corresponding to a remaining portion of the NIR detail portion. As such, the region of the first NIR image is protected (550) from a see-through effect that could potentially cause a privacy concern in the first fusion image.

Under some circumstances, the first fused image 518 is processed using a post processing color tuning module 520 to tune its color. The original RGB image 502 is fed into the color tuning module 520 as a reference image. Specifically, the first fused image 518 is decomposed (522) into a fused base portion and a fused detail portion, and the RGB image 502 is decomposed (522) into a second RGB base portion and a second RGB detail portion. The fusion base portion of the first fused image 518 is swapped (524) with the second RGB base portion. Stated another way, the fused detail portion is preserved (524) and combined with the second RGB base portion to generate a second fused image 526. In some embodiments, color of the first fused image 518 deviates from original color of the RGB image 502 and looks unnatural or plainly wrong, and a combination of the fused detail portion of the first fused image 518 and the second RGB base portion of the RGB image 502 (i.e., the second fused image 526) can effectively correct color of the first fused image 518. More details on color tuning of a fused image are discussed below with reference to FIG. 16.

Alternatively, in some embodiments not shown in FIG. 5, color of the first fused image 518 is corrected based on a plurality of color channels in a color space. A first color channel (e.g., a blue channel) is selected from the plurality of color channels as an anchor channel. An anchor ratio is determined between a first color information item and a second color information item that correspond to the first color channel of the first RGB 502' and the first fused image 518, respectively. For each of one or more second color channels (e.g., a red channel, a green channel) distinct from the first color channel, a respective corrected color information item is determined based on the anchor ratio and at least a respective third information item corresponding to the respective second color channel of the first RGB image 502'. The second color information item of the first color channel of the first fused image and the respective corrected color information item of each of the one or more second color channels to generate a third fused image. More details on color correction are discussed below with reference to FIG. 10.

In some embodiments, the first fused image 518 or second fused image 526 is processed (528) to dehaze the scene to see through fog and haze. For example, one or more hazy zones are identified in the first fused image 518 or second fused image 526. A predefined portion of pixels (e.g., 0.1%, 5%) having minimum pixel values are identified in each of the one or more hazy zones, and locally saturated to a low-end pixel value limit. Such a locally saturated image is blended with the first fused image 518 or second fused image 526 to form a final fusion image 532 which is properly dehazed while having enhanced NIR details with original RGB color. A saturation level of the final fusion image 532 is optionally adjusted (530) after the haze is removed locally (528). Conversely, in some embodiments, the RGB image 502 is pre-processed to dehaze the scene to see through fog and haze prior to being converted (508) to the radiance domain or decomposed (510) to the RGB detail and base portions. Specifically, one or more hazy zones are identified in the RGB image 502 that may or may not have been geometrically manipulated. A predefined portion of pixels (e.g., 0.1%, 5%) having minimum pixel values are identified in each of the one or more hazy zones of the RGB image 502, and locally saturated to a low-end pixel value limit. The locally saturated RGB image is geometrically manipulated (506) and/or converted (508) to the radiance domain. More details on haze suppression in any single image are discussed below with reference to FIG. 18A.

In some embodiments, the framework 500 is implemented at an electronic device (e.g., 200 in FIG. 2) in accordance with a determination that the electronic device operates in a high dynamic range (HDR) mode. Each of the first fused image 518, second fused image 526, and final fusion image 532 has a greater HDR than the RGB image 502 and NIR image 504. The set of weights used to combine the base and detail portions of the RGB and NIR images are determined to increase the HDRs of the RGB and NIR images. In some situations, the set of weights corresponds to optimal weights that result in a maximum HDR for the first fused image. However, in some embodiments, it is difficult to determine the optimal weights, e.g., when one of the RGB and NIR images 502 and 504 is dark while the other one of the RGB and NIR images 502 and 504 is bright due to their differences in imaging sensors, lens, filters, and/or camera settings (e.g., exposure time, gain). Such a brightness difference is sometimes observed in the RGB & NIR images 502 and 504 that are taken in a synchronous manner by image sensors of the same camera. In this application, two images are captured in a synchronously manner when the two images are captured concurrently or within a predefined duration of time (e.g., within 2 seconds, within 5 minutes), subject to the same user control action (e.g., a shutter click) or two different user control actions.

It is noted that each of the RGB and NIR images 502 and 504 can be in a raw image format or any other image format. Broadly speaking, in some embodiments, the framework 500 applies to two images that are not limited to the RGB and NIR images 502 and 504. For example, a first image and a second image are captured for a scene by two different sensor modalities of a camera or two distinct cameras in a synchronous manner. After one or more geometric characteristics are normalized for the first image and the second image, the normalized first image and the normalized second image are converted to a third image and a fourth image in a radiance domain, respectively. The third image is decomposed to a first base portion and a first detail portion, and the fourth image is decomposed to a second base portion and a second detail portion. A weighted combination of the first base portion, first base portion, second detail portion and second detail portion using a set of weights. The weighted combination in the radiance domain is converted to a first fused image in an image domain. Likewise, in different embodiments, image registration, resolution matching, and color tuning may be applied to the first and second images.

Color Image and Near-Infrared Image Fusion in Radiance Domain

Since RGB and NIR image sensors are two different sensor modalities, their images not only differ in color but also in brightness and details. Many algorithms attempt to find optimal weights to combine the RGB and NIR images. However, the optimal weights are difficult to be found especially if one image is dark while the other is very bright, due to their differences in imaging sensors, lens, filters, and camera settings (such as exposure time and gains). A brightness variation happens even when both RGB and NIR images are taken synchronously on the same camera. As such, a color image (e.g., an RGB image) is combined with an NIR image in a radiance domain to compensate for a difference of image brightness. Such brightness compensation is applicable to input images (e.g., a raw image, a YUV image) at any stage of an image signal processing pipeline. Specifically, a radiance of an RGB or NIR image having a smaller dynamic range is mapped into a larger dynamic range of the RGB or NIR image. After such normalization, radiances of the RGB and NIR images are fused and transformed back to an image domain in which color channels a* and b* are optionally merged with luminance or grayscale information of the fused radiances to a color fusion image.

Figure 6:
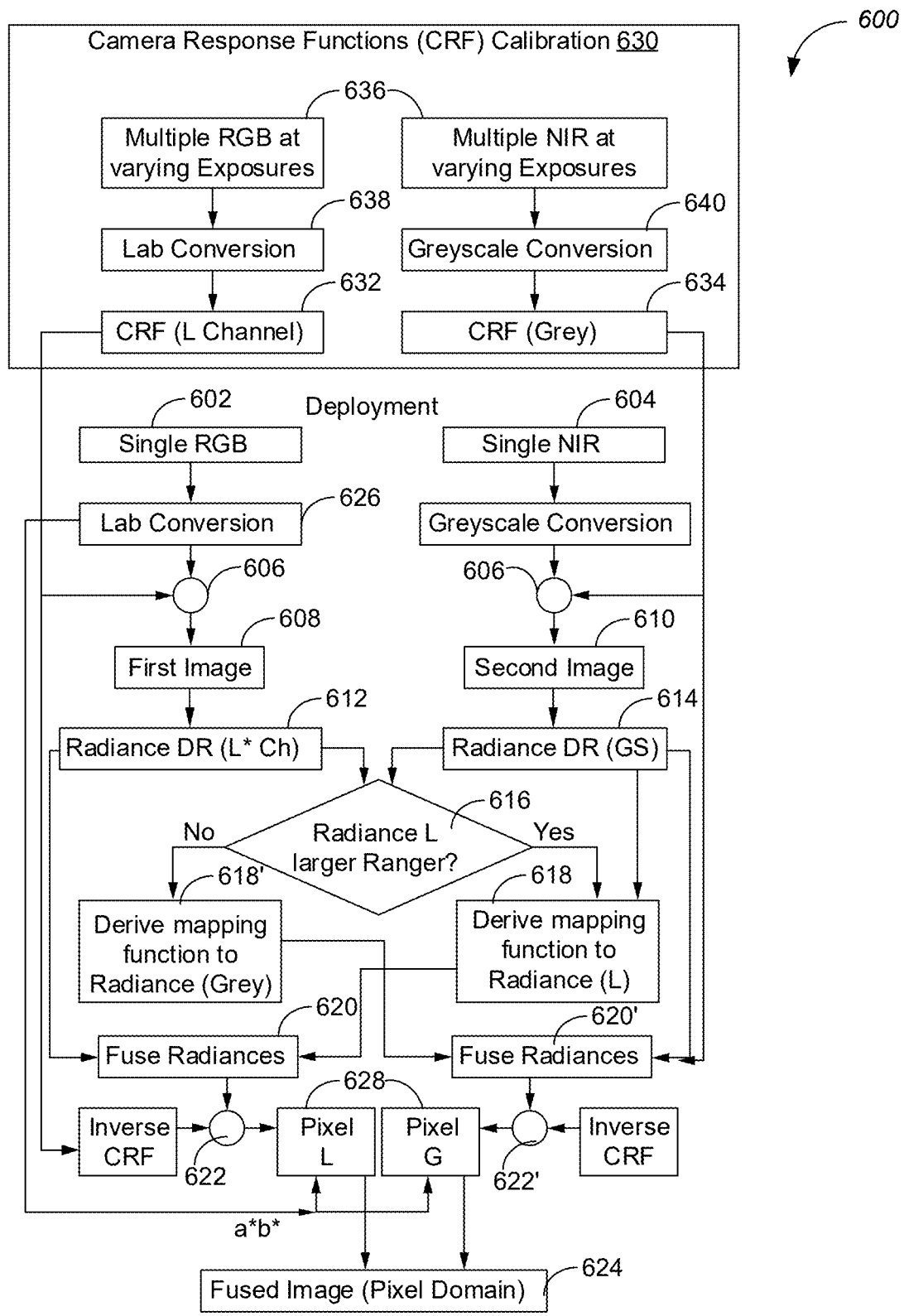
FIG. 6 is another example framework of fusing an RGB image and an NIR image, in accordance with some embodiments.

FIG. 6 is another example framework 600 of fusing an RGB image 602 and an NIR image 604, in accordance with some embodiments. Two images are captured simultaneously in a scene (e.g., by different image sensors of the same camera or two distinct cameras). In an example, the two images include the RGB and NIR images 602 and 604 that are captured by a visible light image sensor and an NIR image sensor of the same camera, respectively. In another example, one of the two images is a color image that is one of a raw image and a YUV image. The two images in an image domain are converted (606) to a first image 608 and a second image 610 in a radiance domain. The first image 608 has a first radiance covering a first dynamic range 612 and that the second image 610 has a second radiance covering a second dynamic range 614. In accordance with a determination (616) that the first dynamic range 612 is greater than the second dynamic range 614, a radiance mapping function 618 is determined between on the first and second dynamic ranges 612 and 614. The second radiance of the second image 610 is mapped from the second dynamic range 614 to the first dynamic range 612 according to the mapping function 618. The first radiance of the first image 608 and the mapped second radiance of the second image 610 are combined to generate a fused radiance image 620. In an example, the fused radiance image 620 is an average of the first radiance of the first image 608 and the mapped second radiance of the second image 610. The fused radiance image 620 in the radiance domain is converted (622) to a fused pixel image 624 in the image domain.

In some embodiments, the first image 608 is converted from the RGB image 602 captured by the camera, and the first radiance of the first image 608 corresponds to a luminance (L) channel of the first image 608. The second image 610 is converted from an NIR image 604 captured by the camera, and the second radiance of the second image 610) corresponds to a grayscale image of the second image 610 and is mapped to the first dynamic range 612 of the first image 608. Further, in some situations, in accordance with a determination that the first dynamic range 612 is less than the second dynamic range 614, a radiance mapping function 618' is determined between on the first and second dynamic ranges 612 and 614. The first radiance of the first image 608 is mapped from the first dynamic range 612 to the second dynamic range 614 according to the mapping function 618". The second radiance of the second image 610 and the mapped first radiance of the first image 608 are combined to generate a fused radiance image 620'. The fused radiance image 620' in the radiance domain is converted (622") to the fused pixel image 624 in the image domain. Additionally, in some embodiments, in accordance with the determination that the first dynamic range 612 is less than the second dynamic range 614, the first radiance corresponding to the L* channel of the first image 608 is mapped to the second dynamic range 614 of the second image 610, and combined with the greyscale of the second image 610.

Conversely, in some embodiments not shown in FIG. 6, the first image 608 is converted from an NIR image 604 captured by the camera, and the first radiance of the first image 608 corresponds to greyscale of the first image 608. The second image 610 is converted from a color image captured by the camera, and the second radiance of the second image 610 corresponds to an L* channel of the second image 610 and is mapped to the first dynamic range of the first image 608.

As noted above, in some embodiments, the two images are captured by a first image sensor and a second image sensor of the camera. For example, the RGB and NIR images 602 and 604 are captured by a visible light image sensor and an NIR image sensor of the same camera, respectively. The first and second image sensors have different camera response functions (CRFs). A first CRF 632 and a second CRF 634 are determined (630) for the first image sensor and the second image sensor of the camera, respectively. The two images 602 and 604 are converted to the first and second images 608 and 610 in accordance with the first and second CRFs 632 and 634 of the camera, respectively. The fused radiance image 620 or 620' is converted to the fused pixel image 624 based on the first CRF 632 or second CRF 634 of the camera (specifically, based on an inverse of the CRF 632 or 634), respectively. Further, in some embodiments, a plurality of exposure settings are applied (636) to each of the first and second image sensors of the camera, and a set of CRF calibration images are captured based on the plurality of exposure settings to determine the first and second CRFs 632 and 634. In some situations, the framework 600 is directed to normalize the radiances of the two images 602 and 604 (i.e., a luminance channel of the RGB image 602 and a grayscale image of the NIR image 604). For the first CRF 632 associated with the RGB image 602, a first subset of CRF calibration images are converted (638) to the CIELAB color space, and channel L* information is extracted from the first subset of CRF calibration images to determine the first CRF 632 associated with the channel L* information. For the second CRF 634 associated with the NIR image 604, a second subset of CRF calibration images are converted (640) to grayscale images to determine the second CRF 634 associated with the grayscale images. Alternatively, in some implementations, the first and second CRF 632 and 634 of the camera are pre-calibrated with a predefined radiance of a luminaire, and the radiance mapping function 618 or 618' is determined based on the first and second CRFs 632 and 634 of the camera (i.e., the radiance mapping function 618 or 618' is at least partially predetermined based on the first and second CRF 632 and 634).

In some embodiments, channel a* color information and channel b* color information are determined for one of the two images. For example, when the RGB image 602 is converted (606) to the first image 608 in the radiance channel, the RGB image 602 is decomposed (626) to channel L* information, the channel a* color information, and the channel b* color information in a CIELAB color space, and the channel L* information is converted to the first image 608. Alternatively, in some embodiments, the channel L* information corresponds to luminance for the one of the two images. The channel a* information optionally corresponds to green or red. The channel b* information optionally corresponds to blue or yellow.

Grayscale information 628 of the fused pixel image 624 is determined based on the first image 608 when the fused radiance image 620 in the radiance domain is converted (622) to the fused pixel image 624 in the image domain. The grayscale information 628 of the fused pixel image 624 is merged with the channel a* color information and channel b* color information to generate the fused pixel image 624 with color. In some embodiments, the fused pixel image 624 is equalized. Conversely, in some embodiments, one of the two images (e.g., the RGB image 602, the NIR image 604) is equalized before a corresponding radiance is adjusted by the framework 600.

The two images 602 and 604 are optionally pre-processed before their radiances are normalized, and the fused pixel image 624 is optionally processed after being converted from the fused radiance image 620. In some embodiments not shown in FIG. 6, one or more geometric characteristics of the two images 602 and 604 are normalized by reducing a distortion level of at least a portion of the two images 602 and 604, transforming the two images 602 and 604 into a coordinate system associated with a field of view, or matching resolutions of the two images 602 and 604. In some embodiments, color characteristics of the fused pixel image 624 are tuned in the image domain. The color characteristics of the fused pixel image 624 include at least one of color intensities and a saturation level of the fused pixel image 624. In some embodiments, the two images including the RGB image 602. In the image domain, the fused pixel image 624 is decomposed into a fused base portion and a fused detail portion, and the RGB image 602 is decomposed into a second RGB base portion and a second RGB detail portion. The fused detail portion and the second RGB base portion are combined to generate a second fused image. In some embodiments, one or more hazy zones are identified in the RGB image 602 or in the fused pixel image 624. White balance is adjusted for each of the one or more hazy zones locally by saturating a predefined portion (e.g., 0.1%, 5%) of pixels in each of the one or more hazy zones to a low-end pixel value limit (e.g., 0).

Figures 7A, 7B:
FIGS. 7A and 7B are an example RGB image and an example NIR image, in accordance with some embodiments, respectively.
Figures 8A, 8B, 8C:
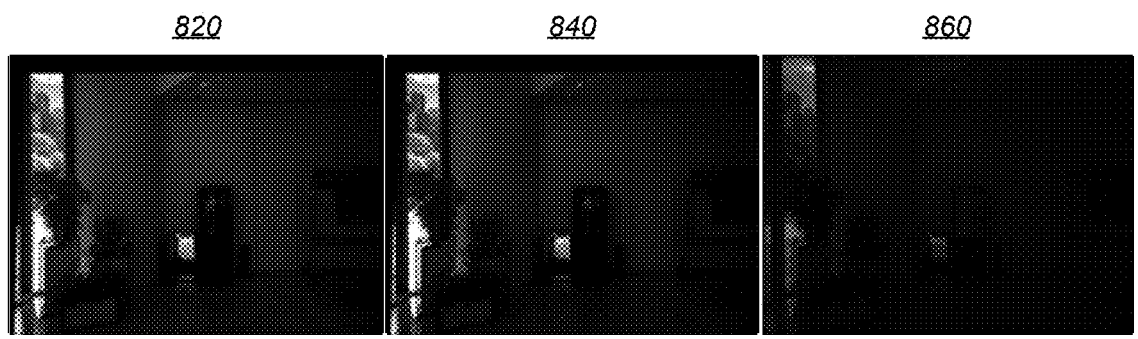
FIGS. 8A-8C are a radiance of the NIR image, an updated radiance of the NIR image that is mapped according to a radiance of the RGB image, and the radiance of the RGB image, in accordance with some embodiments, respectively.
Figures 9A, 9B:
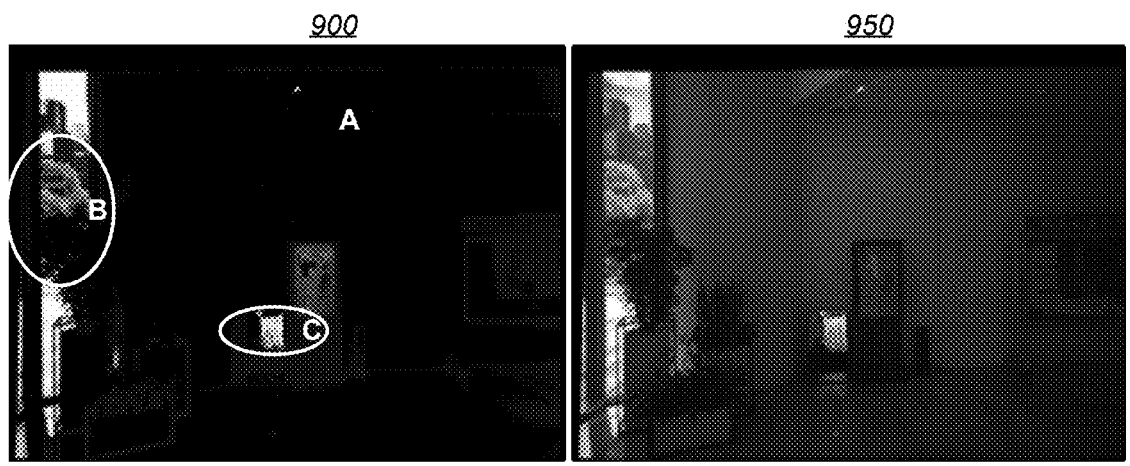
FIGS. 9A and 9B are a fused pixel image involving no radiance mapping and a fused pixel image generated based on radiance mapping, in accordance with some embodiments, respectively.

FIGS. 7A and 7B are an example RGB image 602 and an example NIR image 604, in accordance with some embodiments, respectively. FIGS. 8A-8C are a radiance 820 of the NIR image 604, an updated radiance 840 of the NIR image 604 that is mapped according to a radiance 860 of the RGB image 602, and the radiance 860 of the RGB image 602, in accordance with some embodiments, respectively. FIGS. 9A and 9B are a fused pixel image 900 involving no radiance mapping and a fused pixel image 950 generated based on radiance mapping, in accordance with some embodiments, respectively. Referring to FIGS. 7A and 7B, the first dynamic range 612 of the first radiance of the RGB image 602 is greater than the second dynamic range 614 of the second radiance of the NIR image 604. Referring to FIGS. 8A-8C, in accordance with the framework 600, the radiance 860 of the NIR image 604 is mapped to the first dynamic range 612 of the radiance 820 of the RGB image 602, resulting in the updated second radiance 840 of the NIR image 604. Referring to FIGS. 9A and 9B, the fused pixel image 950 generated based on radiance mapping demonstrated better image quality than the fused pixel image 900 that does not involve radiance mapping. For example, objects in the room (A) are nearly invisible, and colors of objects in bright zones (B and C) are unnatural in the fused pixel image 900 involving no radiance mapping.

Color Correction of Color Image & Near-Infrared Image Fusion in Radiance Domain

Information from multiple image sources can be combined into a compact form of image that contains more information than any single source image. Image fusion from different sensory modalities (e.g., visible light and near-infrared image sensors) is challenging as the images that are fused contain different information (e.g., colors, brightness, and details). For example, objects with strong infrared emission (e.g., vegetation, red road barrier) appear to be brighter in an NIR image than in an RGB image. After the RGB and NIR images are fused, color of a resulting fused image tends to deviate from the original color of the RGB image. In some embodiments, a proper color correction algorithm is applied bring the color of the resulting fused image to a natural look. As explained above with reference to FIG. 6, pixel values of the RGB and NIR images are different, and a radiance value of a pixel of the same object point in the scene may be adjusted to the same dynamic range. The pixel values in an image domain are transformed to radiance values in a radiance domain, and the radiance values that are normalized into the same dynamic range are combined (e.g., averaged). In an example, the NIR image 604 is converted into a grayscale image and fused with the channel L* information of the RGB image 602, and the fused radiance image 620 is combined with color channel information (i.e., channel a* and b* information) of the RGB image 602 to recover a fused pixel image 624 with color.

Figure 10:
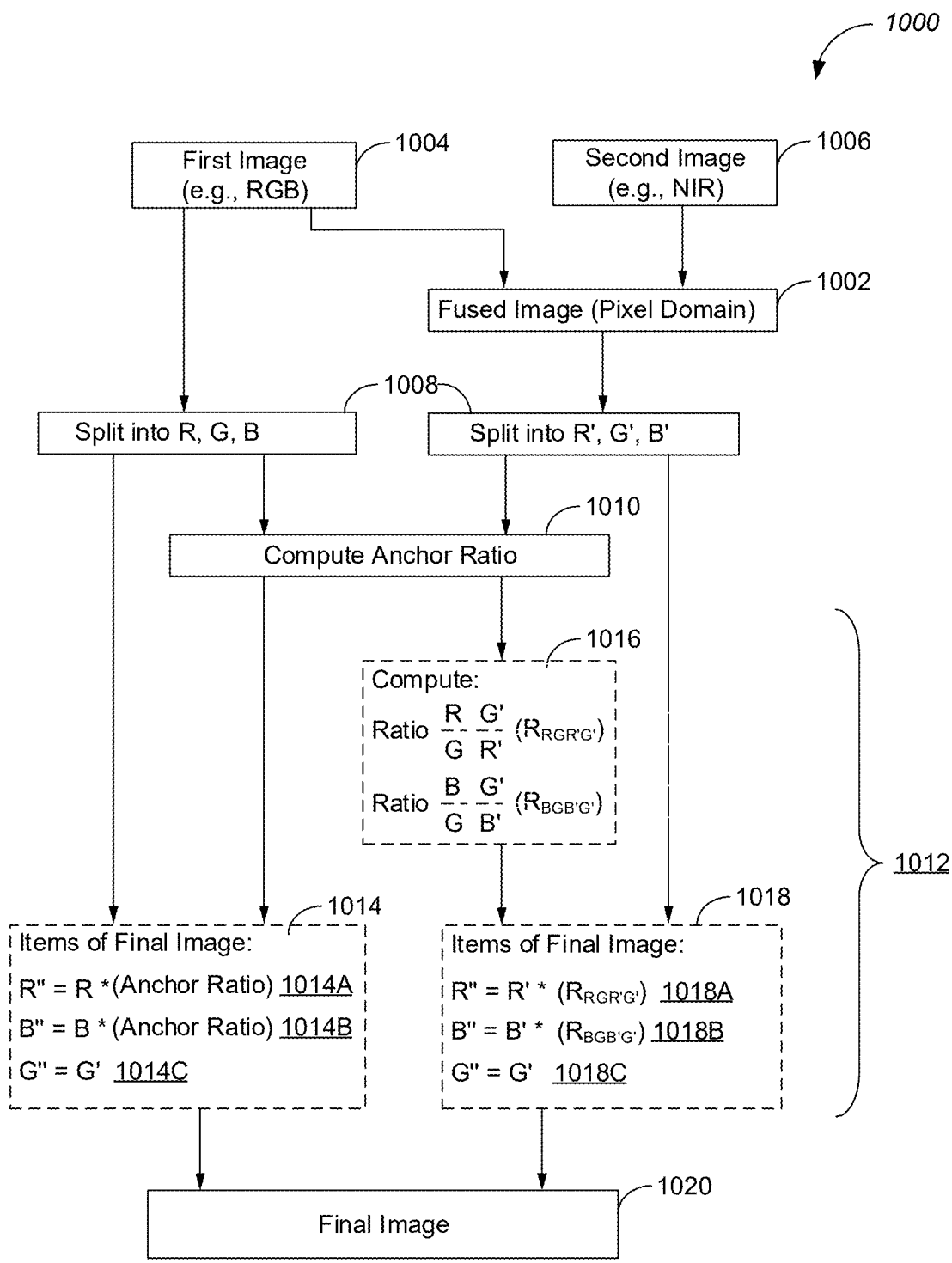
FIG. 10 is an example framework of processing images, in accordance with some embodiments.

FIG. 10 is an example framework 1000 of processing images, in accordance with some embodiments. The framework 1000 is configured to correct color of a fused image 1002 that is combined from two images (e.g., including a first image 1004 which is a color image). In an example associated with the framework 600, the fused image 1002 includes a fused pixel image 624 converted from a fused radiance image 620 that combines radiances of an RGB image 602 (e.g., the first image 1004 in FIG. 10) and an NIR image 604 (e.g., a second image 1006 in FIG. 10) in a radiance domain. Conversely, in some embodiments, the fused image 1002 is fused from the RGB image 1004 using other frameworks distinct from the framework 600, and both the fused image 1002 and the RGB image 1004 are in the image domain. The first image 1004 and second image 1006 are captured simultaneously for a scene (e.g., by different image sensors of the same camera or two distinct cameras), and fused to generate a fused image 1002. The first and fused images 1004 and 1002 correspond to a plurality of color channels in a color space. The first image 1004 is split (1008) into the plurality of color channels, and the fused image 1002 is also split (1008) into the plurality of color channels. For example, the plurality of color channels includes a red channel, a green channel, and a blue channel. The first image 1004 is decomposed to a first red component R, a first green component G, and a first blue component B corresponding to the red, green, and blue channels, respectively. The fused image 1002 is decomposed to a fused red component R', a fused green component G', and a fused blue component B' corresponding to the red, green, and blue channels, respectively.

A first color channel (e.g., the green channel) is selected from the plurality of color channels as an anchor channel, and an anchor ratio is determined (1010) between a first color information item and a second color information item corresponding to the first color channel of the first and fused images 1004 and 1002, respectively. For each of one or more second color channels (e.g., the red or blue channel) distinct from the first color channel, a respective corrected color information item is determined (1012) based on the anchor ratio and at least a respective third information item corresponding to the respective second color channel of the first image. For example, the green channel is selected as the anchor channel, and the anchor ratio $$\left(\frac{G'}{G}\right)$$

is determined between the first green component G and the fused green component G'. For the red channel, a corrected red information item R" is determined (e.g., 1014A) based on the anchor ratio $$\left(\frac{G'}{G}\right)$$

and the first red component K corresponding to the red channel of the first image 1004. For the blue channel, a corrected blue information item B" is determined (e.g., 1014B) based on the anchor ratio $$\left(\frac{G'}{G}\right)$$

and the first blue component B corresponding to the blue channel of the first image 1004.

The second color information item (e.g., G) of the first color channel of the fused image 1002 is preserved (1014C, 1018C) and combined with the respective corrected color information item (e.g., R" and B") of each of the one or more second color channels to generate a final image 1020 in the color space. In some embodiments, the anchor ratio $$\left(\frac{G'}{G}\right)$$

and the respective corrected color information item (e.g., R" and B") of each second color channel are determined on a pixel basis, and the second color information item (e.g., G') of the first color channel and the respective corrected color information items (e.g., R" and B") of the one or more second color channels are combined on the pixel basis. Specifically, in the above example, the fused green component G' of the fused image 1002 is preserved (1014C, 1018C) in the final image 1020 and combined with the corrected red information item R" and the corrected blue information item B".

In an example, the corrected information item R" and the corrected blue information item B" are determined (1014A and 1014B) based on the anchor ratio $$\left(\frac{G'}{G}\right)$$

by combining the respective third color information items R and B of the first image and the anchor ratio as follows:

$$R'' = R\frac{G'}{G} \text{ and } B'' = B\frac{G'}{G} \quad (1)$$

In another example, a respective color ratio $R_{RGR'G'}$, or $R_{BGB'G'}$, is determined (1016) for the respective third information item (e.g., R or B) of the first image 1004 and a respective fourth color information item (e.g., R' or B') corresponding to the respective second color channel of the fused image 1002. The respective fourth color information item, the respective color ratio $R_{RGR'G'}$, Or $R_{BGB'G'}$, and the anchor ratio $$\left(\frac{G'}{G}\right)$$

are combined (1018A and 1018B) to determine the respective corrected color information item (e.g., R" or B") for the respective second color channel. For example, for the red channel, the respective color ratio $R_{RGR'G'}$, and the respective corrected red information item R" are determined as follows:

$$R_{RGR'G'} = \frac{R}{G}\frac{G'}{R'} \text{ and } R'' = R' \cdot R_{RGR'G'}. \quad (2)$$

For the blue channel, the respective color ratio $R_{BGB'G'}$, and the respective corrected blue information item R" are determined as follows:

$$R_{BGB'G'} = \frac{B}{G}\frac{G'}{B'} \text{ and } B'' = B' \cdot R_{BGB'G'} \quad (3)$$

The first color channel (i.e., the anchor channel) is selected from the plurality of color channels according to an anchor channel selection criterion, and applies to the entire fused image 1002. In some embodiments, in accordance with the anchor channel selection criterion, the anchor channel of the fused image 1002 has a smallest overall standard deviation with respect to a corresponding color channel of the first image among the plurality of color channels of the fused image 1002. Stated another way, for each of the plurality of color channels, a respective standard deviation is determined for a respective color channel of the fused image 1002 with respective to the same color channel of the first image 1004. The anchor channel is selected because it has the smallest standard deviation among all color channels.

The first image 1004 and second image 1006 combined to the fused image 1002 are optionally pre-processed before they are fused, and the final image 1020 is optionally processed. In some embodiments not shown in FIG. 10, one or more geometric characteristics of the first and second images 1004 and 1006 are normalized by reducing a distortion level of at least a portion of the first and second images 1004 and 1006, transforming the first and second images 1004 and 1006 into a coordinate system associated with a field of view, or matching resolutions of the first and second images 1004 and 1006. In some embodiments, color characteristics of the final image 1020 are tuned in the image domain. The color characteristics of the final image 1020 includes at least one of color intensities and a saturation level of the final image 1020. In some embodiments, in the image domain, the final image 1020 is decomposed into a fused base portion and a fused detail portion, and the first image is decomposed into a second RGB base portion and a second RGB detail portion. The fused detail portion and the second RGB base portion are combined to generate a target image. In some embodiments, one or more hazy zones are identified in the first image 1004 or the final image 1020. White balance is adjusted for each of the one or more hazy zones locally, e.g., by saturating a predefined portion (e.g., 0.1%, 5%) of pixels in each of the one or more hazy zones to a low-end pixel value limit (e.g., 0)).

Image Alignment with Selective Local Refinement Resolution

Image alignment or image registration is applied to transform different images into a common coordinate system, when these images are taken at different vantage points of the same scene with some common visual coverage of the scene. When two images that are not properly aligned are fused, ghosting occurs in a resulting image. Conversely, no ghost should be observed in an NIR image that is properly registered and overlaid on top of an RGB image, and such two properly registered images can be further fused to improve a visual appearance of the resulting image. As such, image alignment or registration can enable HDR imaging, panoramic imaging, multi-sensory image fusion, remote sensing, medical imaging, and many other image processing applications, thereby playing an important role in the field of computer vision and image processing.

In some embodiments associated with image alignment, feature points are detected in two images that are captured in a synchronous manner, e.g., using a scale invariant feature transform (SIFT) method. Correlations are established across these two images based on those feature points, and a global geometric transform can be computed with those correlations. In some situations, objects in the scene are relatively far away from the camera, and further objects are pulled closer in a long focal length than a short focal length. The global geometric transform provides a registration accuracy level satisfying a registration tolerance. Alternatively, in some situations, depths of the objects vary, e.g., between 1 centimeter and 100 meters, a local geometric transform is implemented to supplemental the global geometric transform and mitigate slight misalignments caused by a variation of the object depth within the scene. The local geometric transform requires relatively more computation resources than the global geometric transform. As such, the local geometric transform is controlled with selective and scalable refinement resolutions to increase the registration accuracy level at various image depths while reducing a required processing time.

Figure 11A:
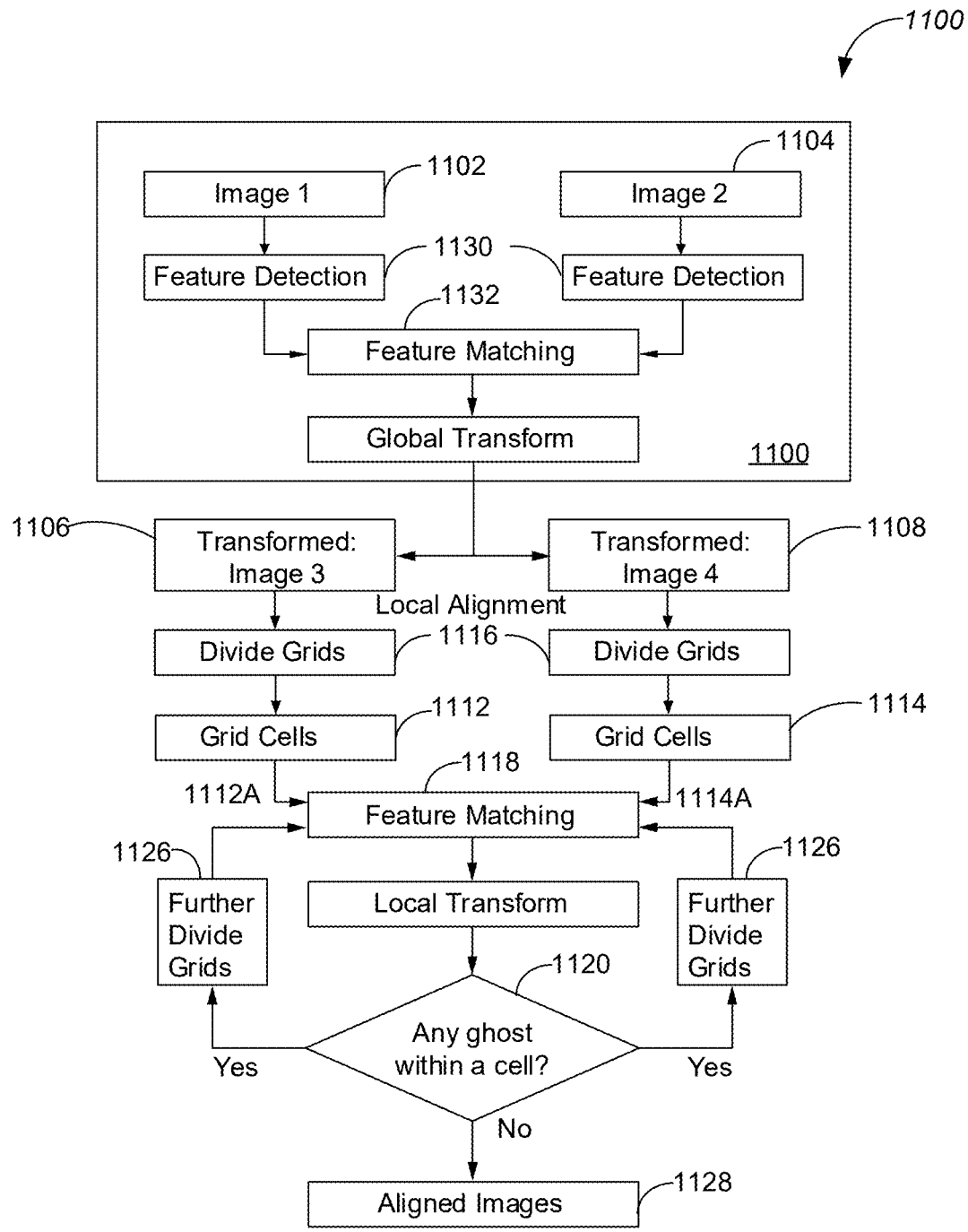
FIG. 11A is an example framework of implementing an image registration process, in accordance with some embodiments.
Figure 11B:
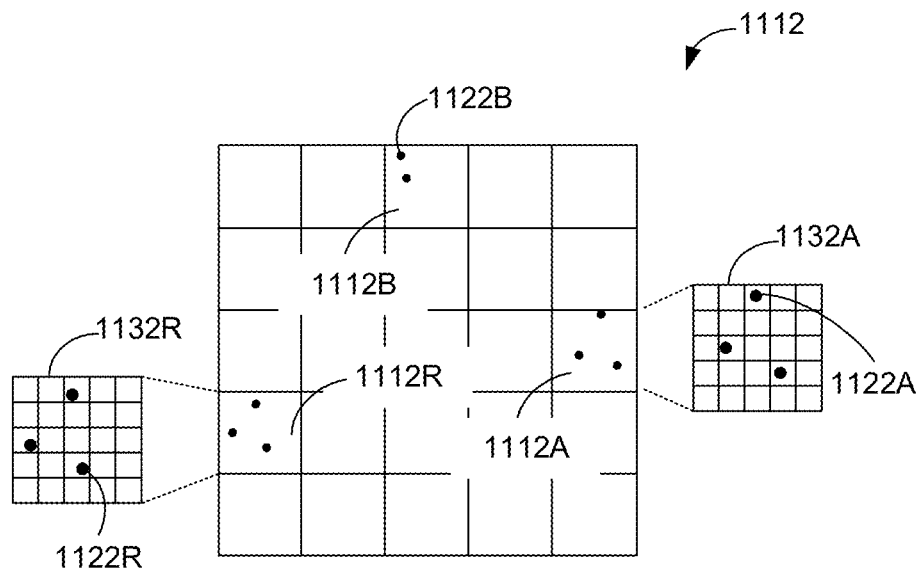
FIGS. 11B and 11C are two images that are aligned during the image registration process, in accordance with some embodiments.
Figure 11C:
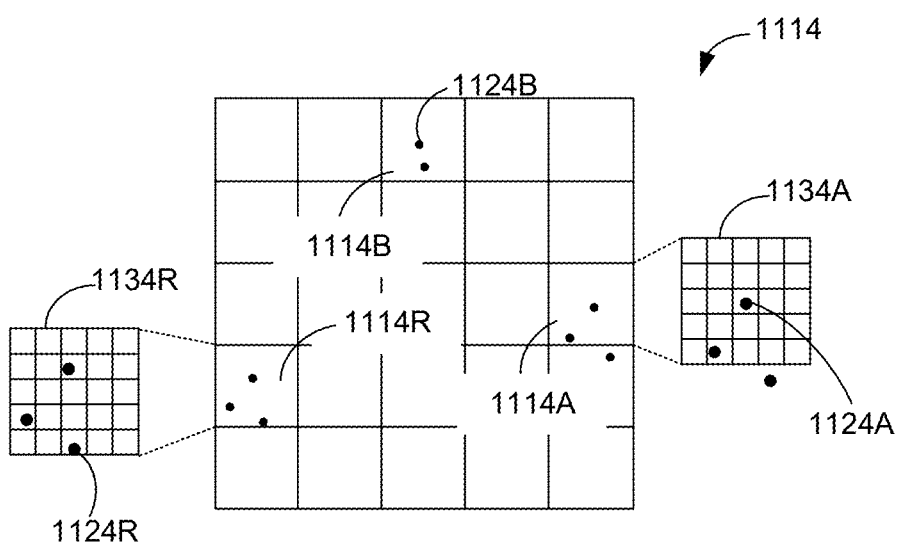

FIG. 11A is an example framework 1100 of implementing an image registration process, in accordance with some embodiments, and FIGS. 11B and 11C are two images 1102 and 1104 that are aligned during the image registration process, in accordance with some embodiments. A first image 1102 and a second image 1104 are captured simultaneously in a scene (e.g., by different image sensors of the same camera or two distinct cameras). In an example, the first and second images 1102 and 1104 include an RGB image and an NIR image that are captured by an NIR image sensor and a visible light image sensor of the same camera, respectively. The first and second images 1102 and 1104 are globally aligned (1110) to generate a third image 1106 corresponding to the first image 1102 and a fourth image 1108 corresponding to the second image 1104, respectively. The fourth image 1108 is aligned with the third image 1106. In some embodiments, one or more global feature points are identified (1130) in both the first and second images 1102 and 1104, e.g., using SIFT, oriented FAST, or rotated BRIEF (ORB). At least one of the first and second images 1102 and 1104 is transformed to align (1132) the one or more global feature points in the first and second images 1102 and 1104. In some embodiments, the third image 1106 is identical to the first image 1102 and used as a reference image, and the first and second images are globally aligned by transforming the second image 1104 to the fourth image 1108 with reference to the first image 1102.

Each of the third image 1106 and the fourth image 1108 is divided (1116) to a respective plurality of grid cells 1112 or 1114 including a respective first grid cell 1112A or 1114A. The respective first grid cell 1112A of the third image 1106 corresponds to the respective first grid cell 1114A of the fourth images 1108. In accordance with a feature matching procedure 1118, one or more first feature points 1122A are identified for the first grid cell 1112A of the third image 1106, and one or more first feature points 1124A are identified for the first grid cell 1114A of the fourth images 1108. Relative positions of the one or more first feature points 1124A in the first grid cell 1114A of the fourth image 1108 are shifted compared with relative positions of the one or more first feature points 1122A in the first grid cell 1112A of the third image 1106. In this example, the first grid cell 1112A of the third image 1106 has three feature points 1122A. Due to a position shift of the fourth image, the first grid cell 1114A of the fourth image 1108 has two feature points 1124A, and another feature point has moved to a grid cell below the first grid cell 1114A of the fourth image 1108.

The first feature point(s) 1122A of the third image 1106 is compared with the first feature point(s) 1124A of the fourth image 1108 to determine (1120) a grid ghosting level of the first grid cells 1112A and 1114A. In some embodiments, the grid ghosting level of the first grid cells 1112A and 1114A is determined based on the one or more first feature points 1122A and 1124A, and compared with a grid ghosting threshold $V_{GTH}$. In accordance with a determination that the grid ghosting level of the first grid cells 1112A and 1114A is greater than the grid ghosting threshold $V_{GTH}$, each of the first grid cells 1112A and 1114A is divided (1126) to a set of sub-cells 1132A or 1134A and the one or more first feature points 1122A or 1124A are updated in the set of sub-cells 1132A or 1134A, respectively. The third and fourth images 1106 and 1108 are further aligned (1128) based on the one or more updated first feature points 1122A or 1124A of the respective first grid cell 1112A or 1114A.

It is noted that in some embodiments, a range of an image depth is determined for the first and second images 1102 and 1104 and compared with a threshold range to determine whether the range of the image depth exceeds the threshold range. Each of the third and fourth images 1106 and 1108 is divided to the plurality of grid cells 1112 or 1114 in accordance with a determination that the range of the image depth exceeds the threshold range.

In some embodiments, after the respective first grid cell 1112A or 1114A are divided to the set of sub-cells 1132A or 1134A, one or more additional feature points are identified in the set of sub-cells in addition to the one or more first feature points 1122A or 1124A. Alternatively, a subset of the one or more first feature points 1122A may be removed when the first feature points 1122A are updated. As such, the one or more updated first feature points 1122A or 1124A includes a subset of the one or more first feature points 1122A or 1124A, one or more additional feature points in the set of the sub-cells 1132A or 1134A, or a combination thereof. Each of the one or more additional feature points is distinct from any of the one or more first feature points 1122A or 1124A. It is noted that in some embodiments, the one or more first feature points 1122A or 1124A includes a subset of the global feature points generated when the first and second images 1102 and 1104 are globally aligned.

In some embodiments, the first and second images 1102 and 1104 are aligned globally based on a transformation function, and the transformation function is updated based on the one or more updated first feature points 1122A or 1124A of the respective first grid cell 1112A or 1114 of each of the third and fourth images 1106 and 1108. The transformation function is used to convert images between two distinct coordinate systems. The third and fourth images 1106 and 1108 are further aligned based on the updated transformation function.

Referring to FIGS. 11B and 11C, in some embodiments, the plurality of grid cells 1112 of the third image 1106 includes remaining grid cells 1112R distinct from and complimentary to the first grid cell 1112A in the third image 1106. The plurality of grid cells 1114 of the fourth image 1108 includes remaining grid cells 1114R distinct from and complimentary to the first grid cell 1114A in the fourth image 1108. The remaining grid cells 1112R and 1114R are scanned. Specifically, one or more remaining feature points 1122R are identified in each of a subset of remaining grid cell 1112R of the third image 1106, and one or more remaining feature points 1124R are identified in a corresponding remaining grid cell 1114R of the fourth image 1108. Relative positions of the one or more remaining feature points 1124R in a remaining grid cell 1114R of the fourth image 1108 are optionally shifted compared with relative positions of one or more remaining feature points 1122R in a remaining grid cell 1112R of the third image 1106. In accordance with a determination that a grid ghosting level of the respective remaining grid cell 1112R or 1114R is greater than the grid ghosting threshold $V_{GTH}$, the respective remaining grid cell 1112R or 1114R is iteratively divided to a set of remaining sub-cells 1132R or 1134R to update the one or more remaining feature points 1122R or 1124R in the set of remaining sub-cells 1132R or 1134R, respectively, until a sub-cell ghosting level of each remaining sub-cell 1132R or 1134R is less than a respective sub-cell ghosting threshold. Optionally, a first subset of the remaining sub-cells 1132R or 1134R is not divided any more. Optionally, each of a subset of the remaining sub-cells 1132R or 1134R is further divided once, twice, or more than twice. In some embodiments, at least one pair of the remaining grid cells 1112R and 1114R are not divided to sub-cells in accordance with a determination that their grid ghosting level is less than the grid ghosting threshold $V_{GTH}$.

In some embodiments, the plurality of grid cells 1112 of the third image 1106 includes a second grid cell 1112B distinct from the first grid cell 1112A, and the plurality of grid cells 1114 of the fourth image 1108 includes a second grid cell 1114B that is distinct from the first grid cell 1114A and corresponds to the second grid cell 1112B of the third image 1106. One or more second feature points 1122B are identified in the second grid cell 1112B of the third image 1106, and one or more second feature points 1124B are identified in the second grid cell 1114B of the fourth image 1108. Relative positions of the one or more second feature points 1124B in the second grid cell 1114B of the fourth image 1108 are optionally shifted compared with relative positions of the one or more second feature points 1122B in the second grid cell 1112B of the third image 1106. It is determined that a grid ghosting level of the respective second grid cell 1112B or 1114B is less than the grid ghosting threshold $V_{GTH}$. The third and fourth images 1106 and 1108 are further aligned based on the one or more second feature points of the respective second grid cell of each of the third and fourth images. That said, the second grid cells 1112B and 1114B do not need to be divided to a set of sub-cells to update the one or more second feature points 1122B and 1124B because the one or more second feature points 1122B and 1124B have been accurately identified to suppress the grid ghosting level of the respective second grid cell 1112B or 1114B.

Stated another way, in some embodiments, a first image 1102 and a second image 1104 of a scene are obtained and aligned globally to generate a third image 1106 corresponding to the first image and a fourth image 1108 corresponding to the second image 1104 and aligned with the third image 1106. Each of the third image 1106 and a fourth image 1108 to a respective plurality of grid cells 1112 or 1114. For each of a subset of grid cell 1112 or 1114 of the third and fourth images 1106 and 1108, one or more local feature points 1122 or 1124 are identified in the respective grid cell 1112 or 1114 of the third image 1106 or fourth images 1108, respectively. In accordance with a determination that a grid ghosting level of the respective grid cell is greater than a grid ghosting threshold $V_{GTH}$, the respective grid cell 1112 or 1114 is iteratively divided to a set of sub-cells 1132 or 1134 to update the one or more local feature points 1122 or 1124 in the set of sub-cells 1132 or 1134, until a sub-cell ghosting level of each sub-cell 1132 or 1134 is less than a respective sub-cell ghosting threshold. The third and fourth images 1106 and 1108 are further aligned based on the one or more updated local feature points 1122 or 1124 of the grid cells 1112 or 1114 of the third and fourth images 1106 and 1108. Optionally, at least one pair of the grid cells 1112 and 1114 are not divided to sub-cells in accordance with a determination that their grid ghosting level is less than the grid ghosting threshold $V_{GTH}$ (i.e., each of the at least one pair of the grid cells 1112 and 1114 fully overlaps with negligible ghosting). Optionally, each of a subset of the grid cells 1112 and 1114 is divided to sub-cells for once, twice, or more than twice.

Cell dividing and feature point updating are implemented iteratively. That said, once a ghost is detected within a grid cell or sub-cell, the grid cell or sub-cell is divided into smaller sub-cells. The feature points 1122 or 1124 that are detected in the grid cell or sub-cell having the ghost can be reused for the smaller sub-cells. The smaller sub-cells within the grid cell or sub-cell having the ghost are filled in with feature points. This process is repeated until no ghost is detected within any of the smaller sub-cells. As such, the framework 1100 provides accurate alignment of the first and second images 1102 and 1104 at a fast processing time.

Referring to FIG. 11A, it is best to start off with larger grid cells, and then further divide the grid cells when the objects within those cells are determined not being aligned well. The grid cells are selectively divided, which controls the computation time while iteratively improving alignment of those grid cells that are initially misaligned. A normalized cross-correlation (NCC) or any ghost detection algorithm can be applied to determine whether objects are aligned in each grid cell (e.g., determine whether the grid ghosting level is greater than the grid ghosting threshold $V_{GTH}$). For local grid-level alignment, a portion of the processing time $T_m$ is spent on finding the corresponding features points in the images 1106 and 1108. Given an image resolution of W×H, where W and H are width and height of the image, a maximum matching time will be W×H×$T_m$. When the image is divided into m×n grid cells, each run takes at most W×H/(m×n) faster than the worst case. For example, for an image size of 4000×3000 pixels and a grid size of 50×50, a processing speed is 4800 times faster than algorithms that perform pixel-by-pixel matching for the entire image.

In some embodiments, the third and fourth images 1106 and 1108 are divided such that each grid cell 1112 or 1114 is used as a matching template having a corresponding feature point 1122 or 1124 defined at a center of the respective grid cell 1112 or 1114. The matching templates of the grid cells 1112 of the third image 1106 are compared and matched to the matching templates of the grid cells 1114 of the fourth image 1108. Optionally, the fourth image 1108 acts as a reference image, and each grid cell 1114 of the fourth image 1108 is associated with a corresponding grid cell 1112 of the third image 1106. For each grid cell 1114 in the fourth image 1108, the grid cells 1112 of the third image 1106 are scanned according to a search path to identify the corresponding grid cell 1112 of the third image 1106. In example, the third and fourth images 1106 and 1108 are rectified, and the search path follows an epipolar line. Similarly and optionally, the third image 1106 acts as a reference image, and each grid cell 1112 of the third image 1106 is associated with a corresponding grid cell 1114 of the fourth image 1108, e.g., by scanning the grid cells 1114 of the fourth image 1108 according to an epipolar line. By these means, the total number of the feature points detected for the third and fourth images 1106 or 1108 can be increased, e.g., doubled in some situations.

It is noted that a ghost between two corresponding grid cells or sub-cells of the third and fourth images 1106 and 1108 is detected, but not replaced with other pixel values to remove the ghost from the scene. Rather, to preserve the image details and the image realism, ghost detection is applied to determine whether the grid cells or sub-cells need to be divided further so that a grid cell or sub-cell contains a surface covering approximately the same image depth. In some embodiments, feature points 1122 or 1124 enclosed within a grid cell or sib-cell are assigned to the grid cell or sub-cell and used in a data term. The data term is used with a similarity transformation term to solve for new vertices to which the grid cell or sub-cell is locally transformed.

After the first and second images 1102 and 1104 are aligned, the first and second images 1102 and 1104 may be fused. For example, referring to FIG. 5, the first and second images (i.e. RGB image 502 and NIR image 504) are converted to a radiance domain, and decomposed to a first base portion, a first detail portion, a second base portion, and a second detail portion. The first base portion, first detail portion, second base portion, and second detail portion are combined using a set of weights. A weighted combination is converted from the radiance domain to a fused image in an image domain. A subset of the weights is optionally increased to preserve details of the first image or second image. Alternatively, in some embodiments, referring to FIG. 6, radiances of the first and second images (i.e. RGB image 602 and NIR image 604) are matched and combined to generate a fused radiance image, which is further converted to a fused image in the image domain. The fused radiance image optionally includes grayscale or luminance information of the first and second images, and is combined with color information of the first image or second image to obtain the fused image in the image domain. Alternatively, in some embodiments, referring to FIG. 14, an infrared emission strength is determined based on luminance components of the first and second images 1402 and 1404. The luminance components of the first and second images 1402 and 1404 are combined based on the infrared emission strength. Such a combined luminance component is further merged with color components of the first image 1402 to obtain a fused image.

Figure 12A:
FIGS. 12A-12C are an example RGB image, an example NIR image, and an improperly registered image of the images in accordance with some embodiments, respectively.
Figure 12B:
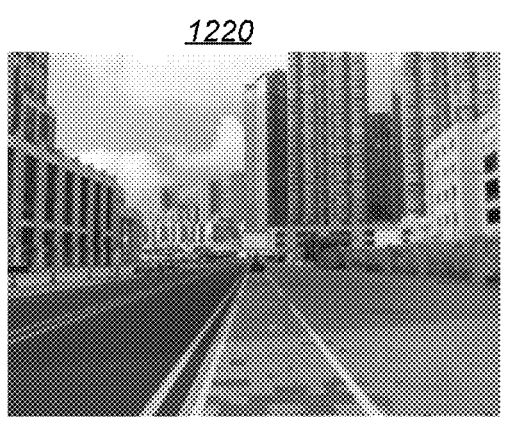
Figure 12C:
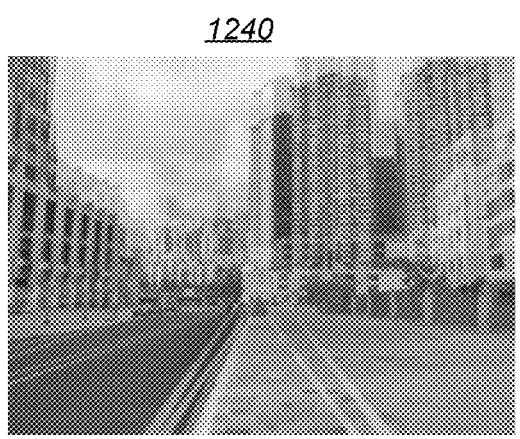
Figure 13A:
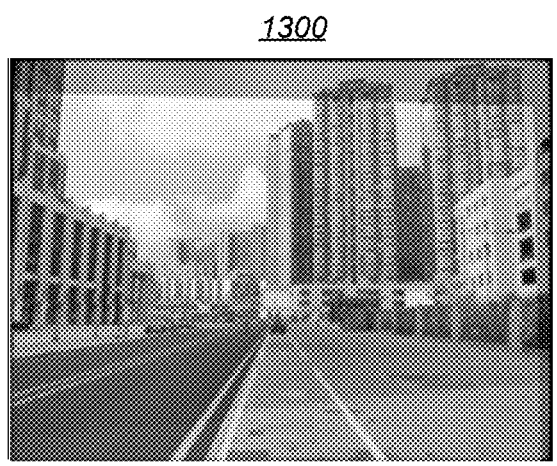
FIGS. 13A and 13B are an overlaid image and a fused image, in accordance with some embodiments, respectively.
Figure 13B:

FIGS. 12A-12C are an example RGB image 1200, an example NIR image 1220, and an improperly registered image 1240 of the images 1200 and 1220 in accordance with some embodiments, respectively. FIGS. 13A and 13B are an overlaid image 1300 and a fused image 1320, in accordance with some embodiments, respectively. When the RGB and NIR images 1200 and 1220 are not aligned properly but fused together, ghosting occurs in the improperly registered image 1240. Specifically, ghosting is observed for buildings in the image 1240), and lines marked on the streets do not overlap for the RGB and NIR images 1200 and 1220. After the RGB and NIR images 1200 and 1220 are aligned and registered, the RGB and NIR images 1200 and 1220 are overlaid on top of each other to obtain the overlaid image 1300. Ghosting has been eliminated as at least one of the RGB and NIR images 1200 and 1220) is shifted and/or rotated to match with the other one of the RGB and NIR images 1200 and 1220. Referring to FIG. 13B, image quality of the fused image 1320 is further enhanced compared with the overlaid image 1300 when some fusion algorithms are applied. More details on these fusion algorithms are discussed with reference to at least FIGS. 5, 6, and 14.

Color Image and Near-Infrared Image Fusion with Base-Detail Decomposition and Flexible Color and Details Adjustment Different sensor modalities can provide images (e.g., RGB and NIR images) that differ in color, brightness, and details. Objects with strong IR emission are seen brighter in an NIR image than in an RGB image. For example, objects with strong IR emission correspond to vegetation. After the RGB and NIR images are fused by averaging their luminance channels, a resulting image's color can deviate from that of the RGB image, and details can be lost in this fusion process. It is beneficial to develop a fusion algorithm that helps a color fusion image look natural while preserving or enhancing details in the fusion image.

Figure 14:
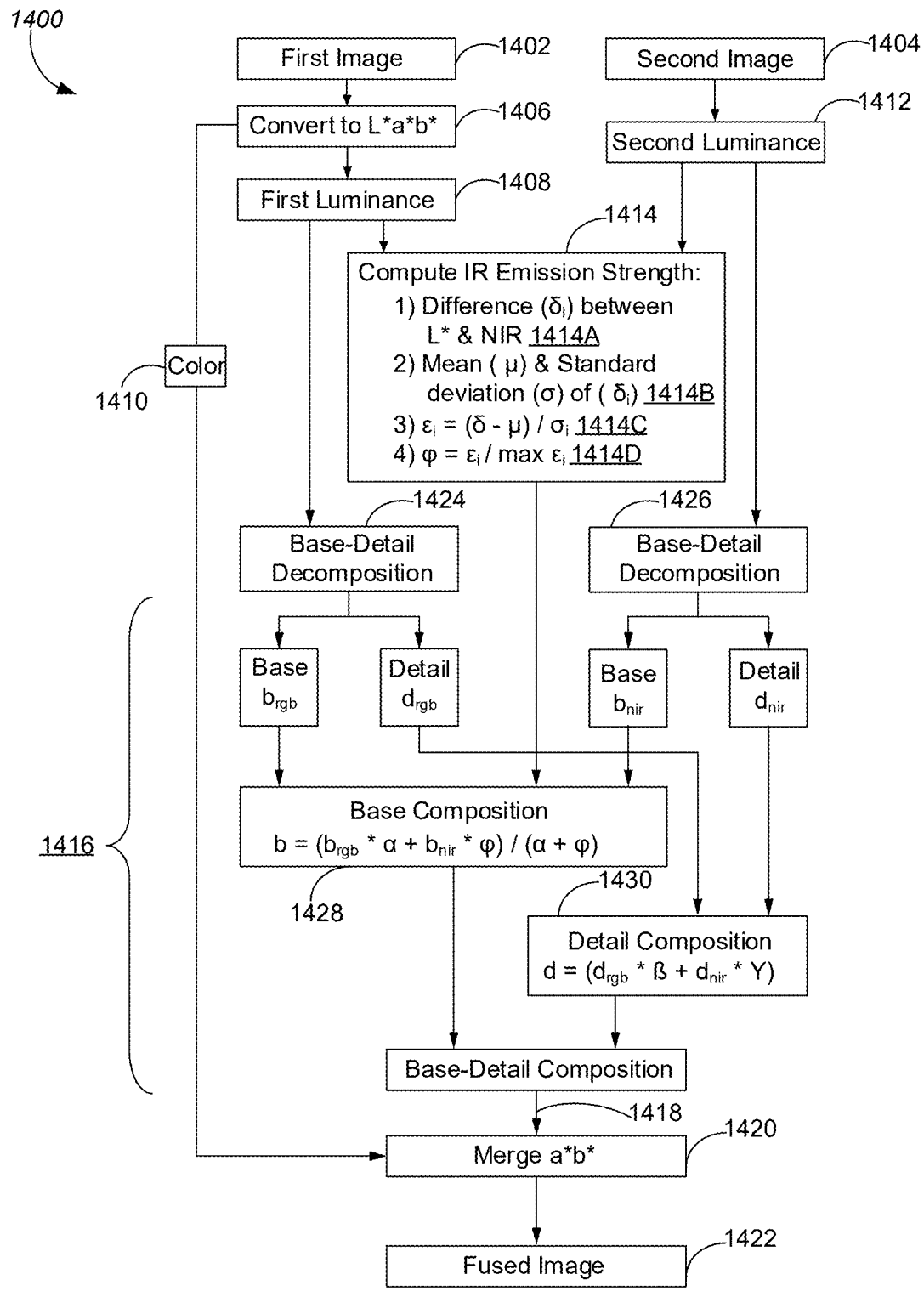
FIG. 14 is another example framework of fusing a first image and a second image, in accordance with some embodiments.

FIG. 14 is another example framework 1400 of fusing a first image 1402 and a second image 1404, in accordance with some embodiments. The first image 1402 and second image 1404 are captured simultaneously in a scene (e.g., by different image sensors of the same camera or two distinct cameras). In some embodiments, the second image 1404 is monochromatic, and does not include any color component. In an example, the first and second images 1402 and 1404 include an RGB image and an NIR image that are captured by a visible light image sensor and an NIR image sensor of the same camera, respectively. The first image 1402 is converted (1406) to a first luminance component 1408 and a first color component 1410 in a color space. Similarly, the second image 1404 is processed to extract a second luminance component 1412. An infrared emission strength ε is determined (1414) based on the first and second luminance components 1408 and 1412. The first and second luminance components are combined (1416) based on the infrared emission strength ε to obtain a combined luminance component 1418. The combined luminance component 1418 is further combined (1420) with the first color component to obtain a fused image 1422.

In some implementations, when the first image 1402 is an RGB image, the first luminance component 1408 is extracted (1406) from an L* channel of the RGB image in a CIELAB color space, and the first color component 1410 is extracted (1406) from an a* channel and a b* channel of the RGB image in the CIELAB color space. Alternatively, in some implementations, the first luminance component 1408 is extracted (1406) from a luminance-based channel in one of HSV, HSL, and LUV color spaces, and the first color component 1410 is extracted (1406) from one or more color-based channels in the one of HSV, HSL, and LUV color spaces.

Figure 15:
FIG. 15 is an example infrared emission strength map of an RGB image and an NIR image, in accordance with some embodiments.

In some embodiments, the infrared emission strength ε includes a respective value $\varepsilon_i$ derived for each pixel of the first or second image 1402 or 1404. A luminance difference $\delta_i$ is determined (1414A) for each pair of pixels in the first and second luminance components 1408 and 1412. A mean u and a standard deviation σ are determined (1414B) for luminance differences $\delta_i$ of pixel pairs in the first and second luminance components 1408 and 1412. A respective value of the infrared emission strength $\varepsilon_i$ is then determined (1414C) for each pair of pixels in the first and second luminance components 1408 and 1412 based on the mean μ, standard deviation σ, and corresponding luminance difference $\delta_i$. Each pixel i of the first and second images 1402 and 1404 corresponds (1414D) to a scale factor $\varphi_i$ represented by a normalized infrared emission strength $$\frac{\varepsilon_i}{\varepsilon_{max}},$$

where $\varepsilon_{max}$ is a maximum value of the infrared emission strength $\varepsilon_i$ of all pixel pairs in the first and second luminance components 1408 and 1412. The normalized infrared emission strength $$\frac{\varepsilon_i}{\varepsilon_{max}}$$

is in a range of [0, 1]. FIG. 15 is an example infrared emission strength map 1500 of an RGB image and an NIR image, in accordance with some embodiments. The infrared emission strength map 1500 is applied to adjust a weighted combination of base portions of the RGB image and NIR image and affects color appearance of the fused image 1422.

In some embodiments, the first illuminance component 1408 is decomposed (1424) to a first base luminance portion $b_{rgb}$ corresponding to low frequency information and a first detail luminance portion $d_{rgb}$ corresponding to high frequency information, e.g., using a guided image filter. The second illuminance component is decomposed (1426) to a second base luminance portion $b_{nir}$ corresponding to low frequency information and a second detail portion $d_{nir}$ corresponding to low frequency information, e.g., using a guided image filter. The first base luminance portion $b_{rgb}$, first detail luminance portion $d_{rgb}$, a second base luminance portion $b_{nir}$, and a second detail portion $d_{nir}$ are combined using a plurality of weights. A first subset of the weights for the first and second base luminance portions $b_{rgb}$ and $b_{nir}$ are based on the infrared emission strength ε, and the first and second base luminance portions $b_{rgb}$ and $b_{nir}$ are combined (1428) as follows:

$$b = \frac{b_{rgb} * \alpha + b_{nir} * \varphi}{\alpha + \varphi} \quad (4)$$

where φ and α are scale factors that control how much of the pixel values are weighted towards the first and second images 1402 and 404 and affect color appearance of the fused image 1422. Particularly, the scale factor φ includes a respective value $\varphi_i$ for each pixel of the first or second image 1402 or 1404, i.e., for each pixel in the first and second base luminance portions $b_{rgb}$. As such, the first and second base luminance portions $b_{rgb}$ and $b_{nir}$ are obtained on a pixel basis and correspond to weights $$\frac{\alpha}{\alpha+\varphi} \text{ and } \frac{\varphi}{\alpha+\varphi},$$

respectively.

In some embodiments, a second subset of the weights for the first and second detail luminance portions $d_{rgb}$ and $d_{nir}$ are based on the infrared emission strength ε. Conversely, in some embodiments, a second subset of the weights for the first and second detail luminance portions $d_{rgb}$ and $d_{nir}$ are independent of the infrared emission strength ε. The first and second detail luminance portions $d_{rgb}$ and $d_{nir}$ are combined (1430) as follows:

$$d = d_{rgb} * \beta + d_{nir} * \gamma \quad (5)$$

where β and γ are two scale factors that affect edge enhancement in the fused image 1422.

Stated another way, in some embodiments, an RGB image 1402 and an NIR image 1404 of a scene are obtained. A first luminance component 1408 and a first color component 1410 are obtained from the RGB image 1402. A second luminance component 1412 is extracted from the NIR image 1404. An infrared emission strength ε is determined (1414) based on the first and second luminance components 1408 and 1412. The first and second luminance components 1408 and 1412 are then combined based on the infrared emission strength ε to obtain a combined luminance component 1418, which is further combined (1420) with the first color component (1416) to obtain a fused image 1422.

The first image 1402 and second image 1404 combined to the fused image 1422 are optionally pre-processed before the infrared emission strength ε is generated therefrom, and the fused image 1422 is optionally processed. In some embodiments not shown in FIG. 14, one or more geometric characteristics of the first and second images 1402 and 1404 are normalized by reducing a distortion level of at least a portion of the first and second images 1402 and 1404, transforming the first and second images 1402 and 1404 into a coordinate system associated with a field of view, or matching resolutions of the first and second images 1402 and 1404 (e.g., using a Laplacian pyramid). In some embodiments, color characteristics of the fused image 1422 are tuned in the image domain. The color characteristics of the fused image 1422 include at least one of color intensities and a saturation level of the fused image 1422. In some embodiments, in the image domain, the fused image 1422 is decomposed into a fused base portion and a fused detail portion, and the first image is decomposed into a second RGB base portion and a second RGB detail portion. The fused detail portion and the second RGB base portion are combined to generate a target image. In some embodiments, one or more hazy zones are identified in the first image 1402, fused image 1422 or target image. White balance is adjusted for each of the one or more hazy zones locally, e.g., by saturating a predefined portion (e.g., 0.1%, 5%) of pixels in each of the one or more hazy zones to a low-end pixel value limit (e.g., 0).

Tuning Color Image Fusion Towards the Original Input Color with Adjustable Details A color image and an NIR image are fused to a compact form of image that contains more information than either one of the color and NIR images. This compact form of image contains more details than either input image, and however, its color may deviate greatly from the RGB image or from the reality. In some embodiments of this application, a fused image is decomposed into base and detail portions. A detail portion of the fused image is extracted and added onto the color image to obtain a final image, thereby causing color of the final image to be substantially consistent with that of the color image while still preserving details of the fusion image. By these means, any fused image can be modified to tune its color towards its original color image, and the corresponding final image looks natural, sees through fog or haze, and have a high dynamic range with color and image details derived from multiple sensor modalities.

Figure 16:
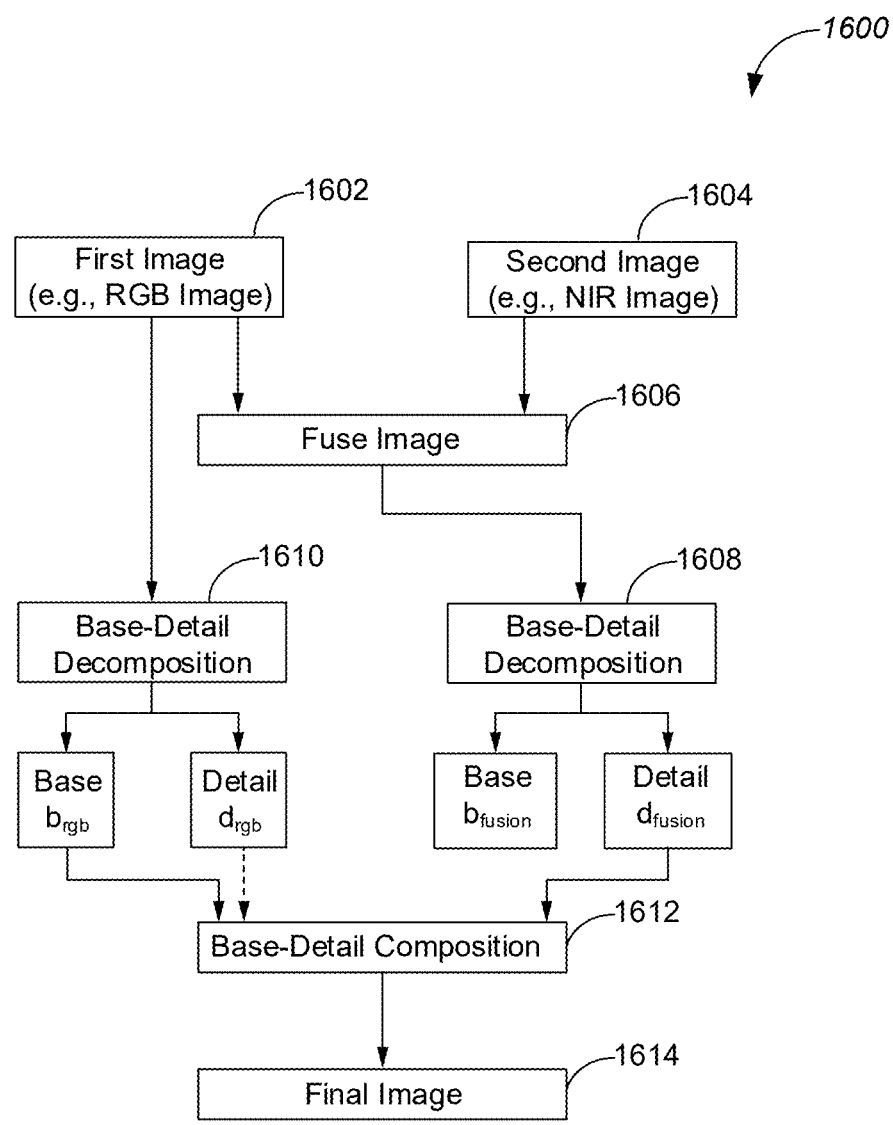
FIG. 16 is another example framework of fusing two images, e.g., for correcting color of a fused image generated from the two images, in accordance with some embodiments.
Figure 17C:
Figure 17C:
Figure 17D:
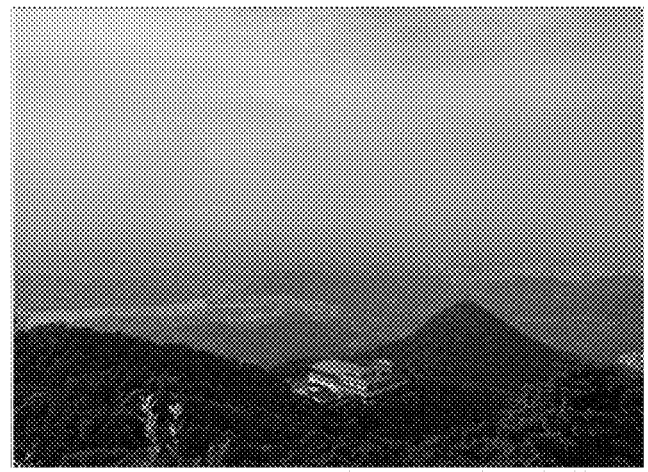

FIG. 16 is another example framework 1600 of fusing two images 1602 and 1604, e.g., for correcting color of a fused image 1606 generated from the two images 1602 and 1604, in accordance with some embodiments. A first image 1602 and a second image 1604 are captured simultaneously in a scene. In an example, the first and second images 1602 and 1604 include an RGB image and an NIR image that are captured by an NIR image sensor and a visible light image sensor of the same camera, respectively. In another example, the first and second images 1602 and 1604 include an RGB image and an NIR image that are captured by a visible light camera and an NIR camera, respectively, and the NIR and visible light cameras cover the same scene. To match the two images 1602 and 1604, view cropping is optionally applied on one or both of the two images 1602 and 1604, and resolutions of the two images 1602 and 1604 are optionally identical or different. After the images 1602 and 1604 are captured, they are processed and fused into a new compact form of image, i.e., the fused image 1605, that contains details from both images 1602 and 1604. The fused image 1605 is then tuned towards color of the first image 1602, e.g., an original input RGB image, while preserving details of the fused image 1606.

Specifically, the first image 1602 and the second image 1604 are combined to generate the fused image 1606. The fused image 1606 is decomposed (1608) to a fusion base component $b_{fusion}$ and a fusion detail component $d_{fusion}$, e.g., using a first guided image filter. The first image 1602 is decomposed (1610) to a first base component $b_{rgb}$ and a first detail component $d_{rgb}$, e.g., using a second guided image filter. In some embodiments, the fusion base and detail components $b_{fusion}$ and $d_{fusion}$ include low-frequency and high-frequency information of the fusion image 1606, and the first base and detail components $b_{rgb}$ and $d_{rgb}$ include low-frequency and high-frequency information of the first image 1602. The first base component $b_{rgb}$ of the first image 1602 and the fusion detail component $d_{fusion}$ of the fused image 1606 are combined (1612) to a final image 1614, which thereby maintains a base color of the first image 1602 while having details of the fused image 1606. In some embodiments, the first base component $b_{rgb}$, the first detail component $d_{rgb}$, and the fusion detail component $d_{fusion}$ are combined to the final image 1614, e.g., using a plurality of weights. When the first image 1602 is an RGB image and the second image 1604 is an NIR image, the first base component $b_{rgb}$ of the RGB image and the fusion detail component $d_{fusion}$ of the fused image are combined to the final image 1614 with or without the first detail component $d_{rgb}$.

Amount or strength of image details in the final image 1614 can be adjusted through the detail components $d_{rgb}$ and $d_{fusion}$ that are optionally controlled through parameters of each guided image filter. For example, a target ratio of the first detail component $d_{rgb}$ and the fusion detail component $d_{fusion}$ is determined for combining the first base component $b_{rgb}$, the first detail component $d_{rgb}$, and the fusion detail component $d_{fusion}$ to the final image 1614. The fused image 1606 is decomposed using a first guided image filter having first filter parameters, and the first image 1602 is decomposed using a second guided image filter having second filter parameters. The first and second filter parameters are adjusted based on the target ratio such that the first detail component $d_{rgb}$ and the fusion detail component $d_{fusion}$ are generated as desired.

In some embodiments, the fused image 1606 has a first haze level and a first dynamic range, and the final image 1614 has a second haze level and a second dynamic range. The second haze level is lower than the first haze level, and the second dynamic range is greater than the first dynamic range. By these means, the framework 1600 is configured to reduce the haze level and improve the dynamic range of the fused image 1606.

The first and second images 1602 and 1604 may be fused by various methods. For example, referring to FIG. 5, the first and second images (i.e. RGB image 502 and NIR image 504) are converted to a radiance domain, and decomposed to a first base portion, a first detail portion, a second base portion, and a second detail portion. The first base portion, first detail portion, second base portion, and second detail portion are combined using a set of weights. A weighted combination is converted from the radiance domain to the fused image in an image domain. A subset of the weights is optionally increased to preserve details of the first image or second image. Alternatively, in some embodiments, referring to FIG. 6, radiances of the first and second images (i.e. RGB image 602 and NIR image 604) are matched and combined to generate a fused radiance image, which is further converted to the fused image in the image domain. The fused radiance image optionally includes grayscale or luminance information of the first and second images, and is combined with color information of the first image or second image to obtain the fused image in the image domain. Alternatively, in some embodiments, referring to FIG. 14, an infrared emission strength is determined based on luminance components of the first and second images 1402 and 1404. The luminance components of the first and second images 1402 and 1404 are combined based on the infrared emission strength. Such a combined luminance component is further merged with color components of the first image 1402 to obtain the fused image.

In accordance with some embodiments implemented by the framework 1600, an RGB image and an NIR image of a scene are obtained. A fused image 1606 is generated to combine the RGB and NIR images. The fused image 1606 is decomposed to a fusion base component $b_{fusion}$ and a fusion detail component $d_{fusion}$. The RGB image 1602 is decomposed to a first base component $b_{rgb}$ and a first detail component $d_{rgb}$. The first base component $b_{rgb}$ of the RGB image and the fusion detail component $d_{fusion}$ of the fused image 1606 are combined to a final image 1614.

The first image 1602 and second image 1604 are optionally pre-processed before being combined to the fused image 1606, and the final image 1614 is optionally processed after being combined from the first and fused images 1602 and 1606. In some embodiments not shown in FIG. 16, one or more geometric characteristics of the first and second images 1602 and 1604 are normalized by reducing a distortion level of at least a portion of the first and second images 1602 and 1604, transforming the first and second images 1602 and 1604 into a coordinate system associated with a field of view, or matching resolutions of the first and second images 1602 and 1604 (e.g., using a Laplacian pyramid). In some embodiments, color characteristics are the final image 1614 is tuned in an image domain. The color characteristics of the final image 1614 include at least one of color intensities and a saturation level of the final image 1614. In some embodiments, one or more hazy zones are identified in the first image 1602 or final image 1614. White balance is adjusted for each of the one or more hazy zones locally, e.g., by saturating a predefined portion (e.g., 0.1%, 5%) of pixels in each of the one or more hazy zones to a low-end pixel value limit (e.g., 0).

FIGS. 17A-17D are an RGB image 1702, an NIR monochrome image 1704, a fused image 1706 combining the RGB image 1702 and NIR monochrome image 1705, and a final image 1708 generated by the framework 1600 shown in FIG. 16 in accordance with some embodiments. That said, the final image 1708 is generated by combining a first base portion $b_{rgb}$ of the RGB image 1702 and a fusion detail portion $d_{fusion}$ of the fused image 1706. The fused image 1706 has a color deviation from the RGB image 1702. In the final image 1708, color of the fused image 1706 is corrected towards color of the RGB image 1702, while details of the fused image 1706 have been substantially preserved.

Dehazing Using Localized Auto White Balance

One of the purposes of image fusion is to dehaze a scene and see through fog and haze. When a hazy image is provided as an input image, a localized auto white balance (AWB) module is applied to reduce a haze level in the input image while preserving color of the input image. In an example, a white layer of haze is removed and remote buildings are revealed in a resulting fused image. Stated another way, the localized AWB module is configured to enable a localized contrast stretching operation. High end pixels that affect a color temperature are not changed. The overall white balance of the resulting fused image does not change, while a local contrast changes for each hazy zone. In some embodiments, the resulting fused image can be fed back to the Localized AWB module to further dehaze the image. That said, a hazy image can be progressively and iteratively processed to remove haze, e.g., suppress a haze level below a haze threshold, thereby revealing details in the input image and preserving color of the input image.

Figure 18A:
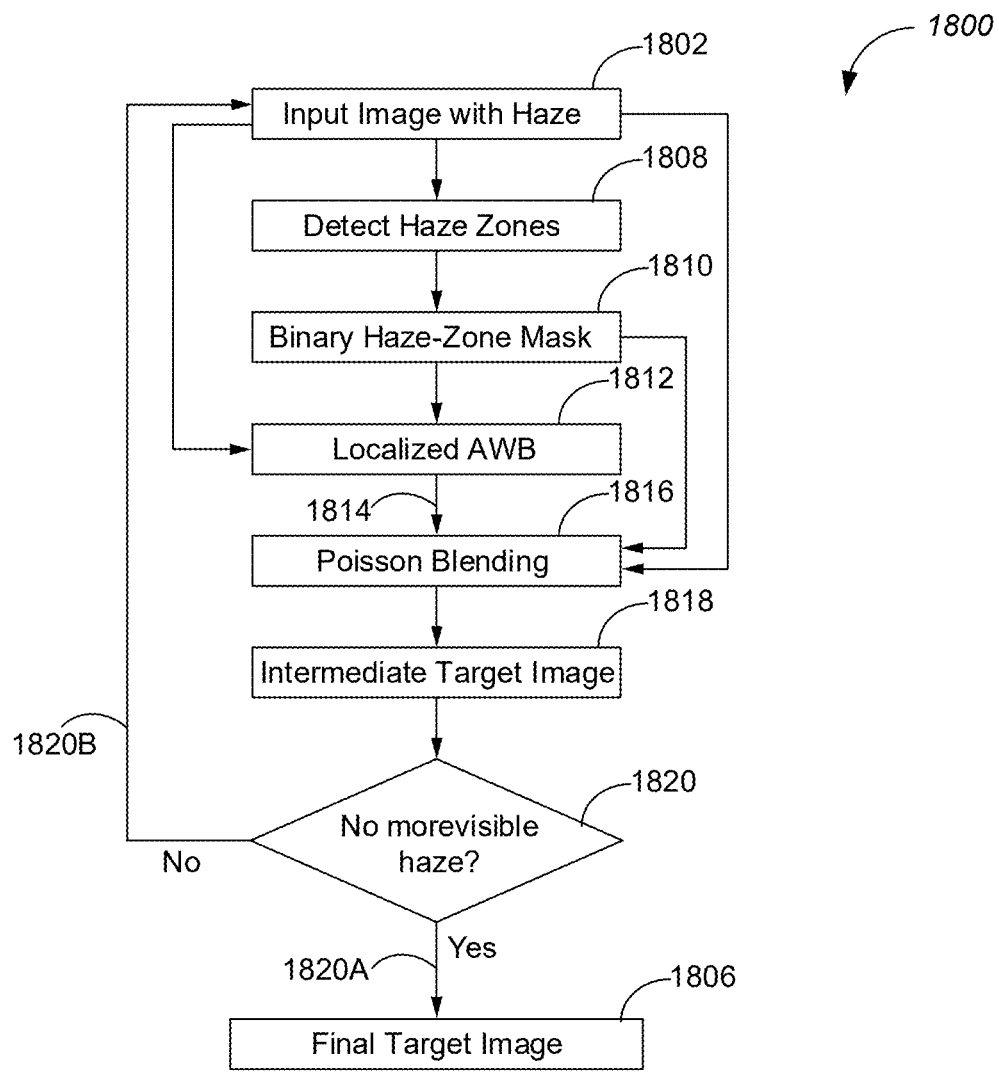
FIG. 18A is an example framework of adjusting white balance locally in an input image, in accordance with some embodiments.
Figure 18B:
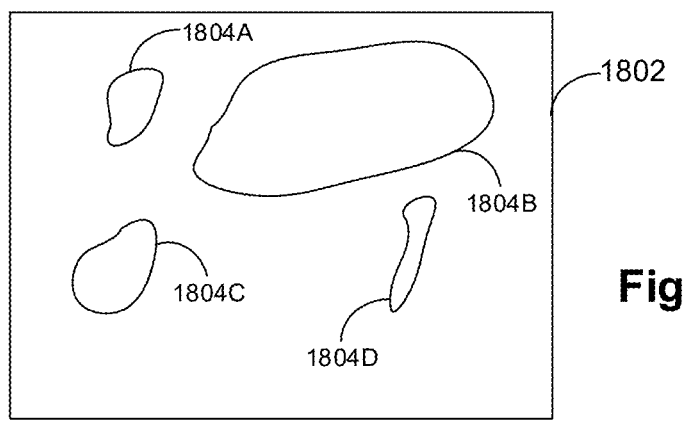
FIG. 18B is an example input image having a plurality of hazy zones, in accordance with some embodiments.

FIG. 18A is an example framework 1800 of adjusting white balance locally in an input image 1802, in accordance with some embodiments, and FIG. 18B is an example input image 1802 having a plurality of hazy zones 1804 (e.g., zones 1804A-1804D), in accordance with some embodiments. The input image 1802 is optionally captured by an image sensor or fused from a plurality of images. The input image 1802 is optionally one of a monochromatic image, a color image, and an NIR image. In an example, the RGB image and NIR image are captured in a synchronous manner (e.g., by different image sensors of the same camera or two distinct cameras), and fused to create the input image 1802. The RGB and NIR images are optionally pre-processed before being combined to the input image 1802. In some embodiments not shown in FIG. 18, one or more geometric characteristics of the RGB and NIR images are normalized by reducing a distortion level of at least a portion of the RGB and NIR images, transforming the RGB and NIR images into a coordinate system associated with a field of view, or matching resolutions of the RGB and NIR images (e.g., using a Laplacian pyramid). In some embodiments, color of the input image 1802 is tuned towards color of the RGB image while preserving image details of the NIR image. The framework 1800 utilizes white balance properties of the input image 1802 to saturate relevant pixels in one or more hazy zones and increase a corresponding local contrast of each hazy zone, thereby removing white cast (haze) in the input image 1802. An original copy and a dehazed copy of the input image 1802 are combined, e.g., using Poisson Blending, to form a seamless final target image 1806.

Specifically, after the input image 1802 is obtained with haze, one or more hazy zones 1804 are detected (1808) in the input image 1802. In some embodiments, a transmission map of the input image 1802 is generated, and the one or one hazy zones 1804 are identified based on the transmission map. In some embodiments, a binary haze-zone mask 1810 is generated and has the same resolution as the input image 1802. Each pixel of the binary haze-zone mask 1810 is equal to "1" or "0", which indicates a corresponding pixel of the input image 1802 is or is not in a respective hazy zone 1804, respectively. Specifically, each pixel of the input image 1802 has a pixel haze level, and the pixel haze level is compared with a predefined pixel haze threshold. For each pixel of the input image 1802, in accordance with a determination that the pixel haze level is above the predefined pixel haze threshold, the corresponding pixel on the binary haze-zone mask 1810 is associated with "1"; otherwise, the corresponding pixel on the binary haze-zone mask 1810 is associated with "0". When a region of pixels of the binary haze-zone mask 1810 are associated with "1", a corresponding region of pixels of the input image 1802 corresponds to a hazy zone 1804. Stated another way, in some embodiments, each of the one or more hazy zones 1804 of the input image 1802 corresponds to a respective plurality of pixels whose pixel haze levels are above the predefined pixel haze threshold.

After the one or more hazy zones 1804 are identified in the input image 1802, a localized AWB operation is implemented (1812) on each of the one or more hazy zones 1804. In some embodiments, a predefined portion of pixels having minimum pixel values are identified in each of the one or more hazy zones 1804, and the input image 1802 is modified to a first image 1814 by locally saturating the predefined portion of pixels in each of the one or more hazy zones to a low-end pixel value limit. In an example, the predefined portion of pixels is equal to or less than a specified percentage (e.g., 5%) of each hazy zone 1804. Pixel values of the input image 1802 correspond to a dynamic range of [0-255], and the predefined portion of pixels of each hazy zone 1804 are saturated to 0. The higher the specified percentage of subjected pixels, the greater the white cast or haze is reduced. In contrast, a subset of pixels having maximum pixel values (e.g., close or equal to 255) of the input image 1802 are preserved in the final target image 1806, thereby keeping a color temperature of the input image 1802. In another example, the predefined portion of pixels is empirically determined and set by a user. The greater the predefined portion of pixels, the greater a dehazing strength. Sometimes, a percentage equal to or less than 0.01% is sufficient to dehaze a corresponding hazy zone 1804. It is noted that in some embodiments, the predefined portion of pixels is identical for all hazy zones 1804 in the input image 1802 while in some embodiments, the predefined portion of pixels is customized for each hazy zone 1804 in the input image 1802.

The input image 1802 and the first image 1814 are blended (1816) to form an intermediate target image 1818 (e.g., a dehazed RGB image). In some embodiments, the intermediate target image 1818 is formed based on the input image 1802, first image 1814, and haze-zone mask 1810 via a Poisson blending operation. The intermediate target image 1818 is analyzed (1820) to determine whether it has a visible haze. When the intermediate target image 1818 is determined (1820A) to have no visible haze, the intermediate target image 1818 is outputted as the final target image 1806, which is thereby formed based on the input image 1802, first image 1814, and haze-zone mask 1810 via the Poisson blending operation. Conversely, when the target image 1818 is determined (1820B) to have the visible haze, the intermediate target image 1818 is used as the input image 1802 to update the hazy zones 1804, haze-zone mask 1810, and pixel values of the hazy zones 1804 iteratively, until the updated pixel values of the hazy zones 1804 do not show (1820A) a visible haze and result in the final target image 1806.

Stated another way, in some embodiments, a haze level of the intermediate target image 1818 is determined, e.g., with reference to a haze threshold. In accordance with a determination that the haze level of the intermediate target image 1818 exceeds the haze threshold, the intermediate target image 1818 is used as a new input image 1802, and one or more hazy zones 1804 are detected in the new input image 1802, which is modified to the first image 1814 by locally saturating the predefined portion of pixels in each of the one or more hazy zones of the new input image 1802 to the low pixel value limit. The new input image 1802 and the first image 1814 are blended to update the intermediate target image 1818. The haze level of the target image 1818 is compared with the haze threshold. This process is iteratively implemented until the haze level of the intermediate target image 1818 does not exceed the haze threshold. The intermediate target image 1818 is finalized as the final target image 1806 (e.g., a final dehazed RGB image).

In some embodiments, the input image 1802 that is processing using the framework 1800 is a fused image combining a first image and a second image. For example, referring to FIG. 5, the first and second images are converted to a radiance domain, and decomposed to a first base portion, a first detail portion, a second base portion, and a second detail portion. The first base portion, first detail portion, second base portion, and second detail portion are combined using a set of weights. A weighted combination is converted from the radiance domain to the fused image (i.e., the input image 1802) in an image domain. A subset of the weights is optionally increased to preserve details of the first image or second image. Alternatively, in some embodiments, referring to FIG. 6, radiances of the first and second images are matched and combined to generate a fused radiance image, which is further converted to a fused image in the image domain. The fused radiance image optionally includes grayscale or luminance information of the first and second images, and is combined with color information of the first image or second image to obtain the fused image (i.e., the input image 1802) in the image domain. Alternatively, in some embodiments, referring to FIG. 14, an infrared emission strength is determined based on luminance components of the first and second images. The luminance components of the first and second images are combined based on the infrared emission strength. Such a combined luminance component is further merged with color components of the first image to obtain the fused image (i.e., the input image 1802). Additionally, in some embodiments, in the image domain, the fused image is decomposed into a fused base portion and a fused detail portion, and the first image is decomposed into a second RGB base portion and a second RGB detail portion. The fused detail portion and the second RGB base portion are combined to update the fused image (i.e., the input image 1802), thereby tuning color of the fused image according to the color of the first image.

Figure 19:
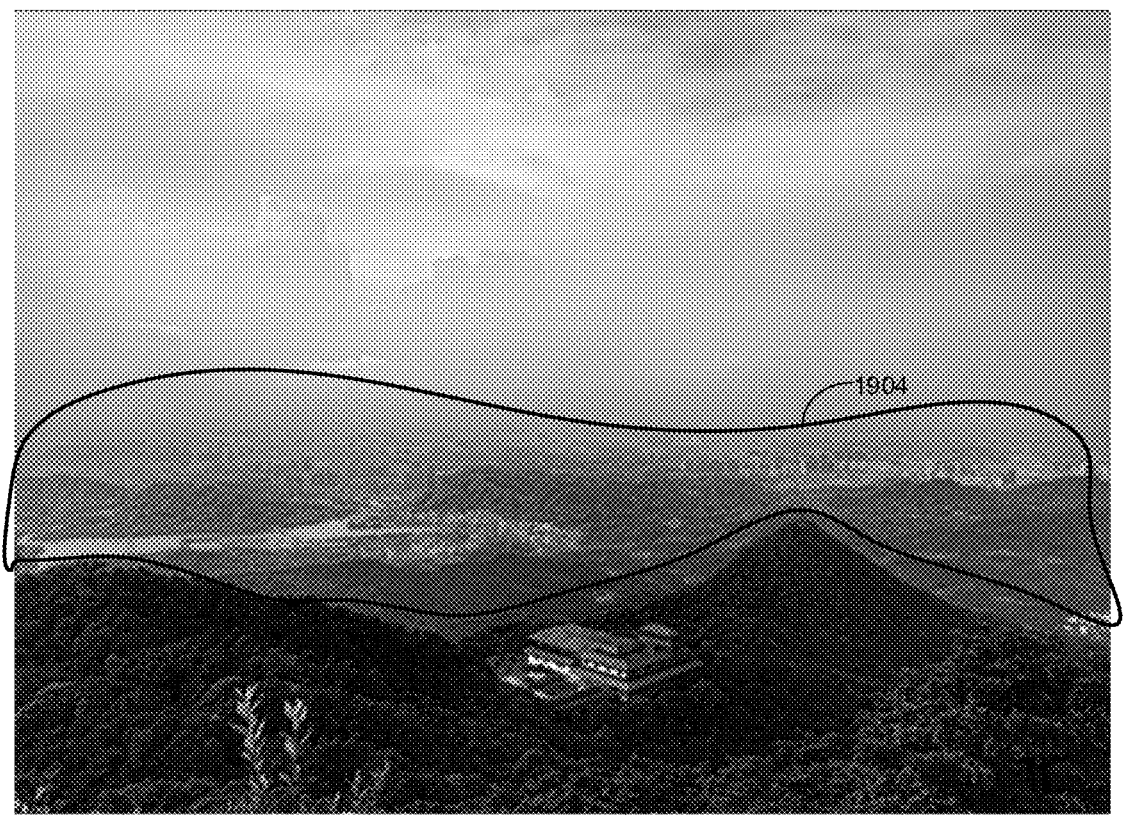
FIG. 19 is an example target image that fused from an RGB image and an NIR image and iteratively dehazed using localized AWB operations, in accordance with some embodiments.

FIG. 19 is an example target image 1900 that is fused from an RGB image and an NIR image and iteratively dehazed using localized AWB operations, in accordance with some embodiments. Haze is progressively removed from a hazy zone 1904, such that remote hills and buildings of a background can be seen through fog or haze. The predefined portion of pixels in the hazy zone 1904 includes 5% of the hazy zone 1904, and is reset to a low-end pixel value limit of "0". A dehazing effect gets more and more pronounced as the localized AWB operations are iteratively implemented. Alternatively, in some embodiments, when a localized AWB operation is applied on the RGB image directly, it enables the dehazing effect on the RGB image as well. The dehazed RGB image is fused with the NIR image to generate the target image 1900.

Image Processing Methods

FIGS. 20-26 are flow diagrams of image processing methods 2000, 2100, 2200, 2300, 2400, 2500, and 2600 implemented at a computer system, in accordance with some embodiments. Each of the methods 2000, 2100, 2200, 2300, 2400, 2500, and 2600 is, optionally, governed by instructions that are stored in a non-transitory computer readable storage medium and that are executed by one or more processors of the computer system (e.g., a server 102, a client device 104, or a combination thereof). Each of the operations shown in FIGS. 20-26 may correspond to instructions stored in the computer memory or computer readable storage medium (e.g., memory 206 in FIG. 2) of the computer system 200. The computer readable storage medium may include a magnetic or optical disk storage device, solid state storage devices such as Flash memory, or other nonvolatile memory device or devices. The computer readable instructions stored on the computer readable storage medium may include one or more of: source code, assembly language code, object code, or other instruction format that is interpreted by one or more processors. Some operations in the methods 2000, 2100, 2200, 2300, 2400, 2500, and 2600 may be combined and/or the order of some operations may be changed. More specifically, each of the methods 2000, 2100, 2200, 2300, 2400, 2500, and 2600 is governed by instructions stored in an image processing module 250), a data processing module 228, or both in FIG. 2.

Figure 20:
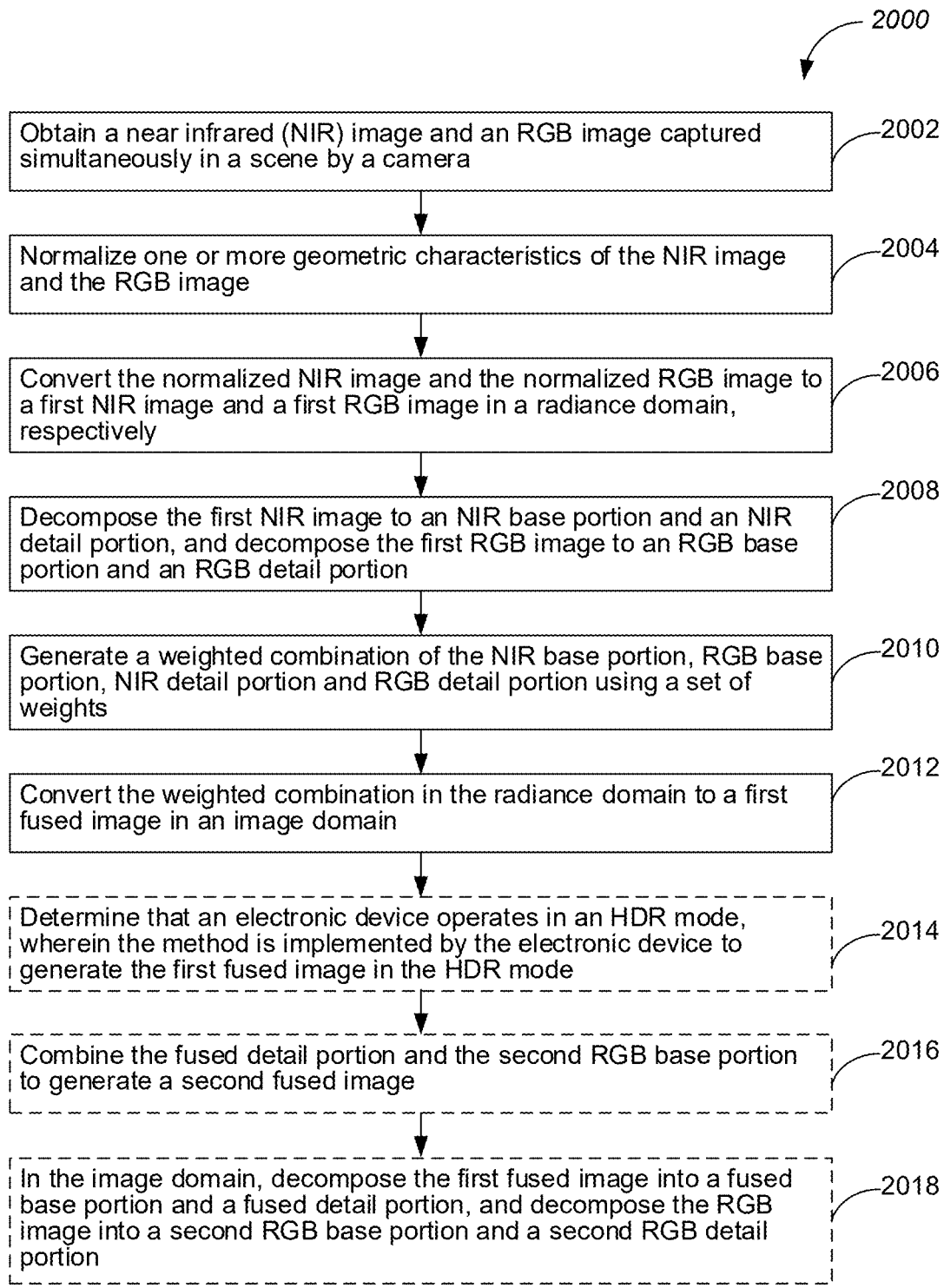
FIG. 20 is a flow diagram of an image fusion method implemented at a computer system, in accordance with some embodiments.

FIG. 20 is a flow diagram of an image fusion method 2000 implemented at a computer system 200 (e.g., a server 102, a client device, or a combination thereof), in accordance with some embodiments. Referring to both FIGS. 5 and 20, the computer system 200 obtains (2002) an NIR image 504 and an RGB image 502 captured simultaneously in a scene (e.g., by different image sensors of the same camera or two distinct cameras), and normalizes (2004) one or more geometric characteristics of the NIR image 504 and the RGB image 502. The normalized NIR image and the normalized RGB image are converted (2006) to a first NIR image 504 and a first RGB image 502' in a radiance domain, respectively. The first NIR image 504 is decomposed (2008) to an NIR base portion and an NIR detail portion, and the first RGB image 502" is decomposed (2008) to an RGB base portion and an RGB detail portion. The computer system generates (2010) a weighted combination 512 of the NIR base portion, RGB base portion, NIR detail portion and RGB detail portion using a set of weights, and converts (2012) the weighted combination 512 in the radiance domain to a first fused image 518 in an image domain. In some embodiments, the NIR image 504 has a first resolution, and the RGB image 502 has a second resolution. The first fused image 518 is upscaled to a larger resolution of the first and second solutions using a Laplacian pyramid.

In some embodiments, the computer system determines a CRF for the camera. The normalized NIR and RGB images are converted to the first NIR and RGB images 504" and 502' in accordance with the CRF of the camera. The weighted combination 512 is converted to the first fused image 518 in accordance with the CRF of the camera. In some embodiments, the computer system determines (2014) that it operates in a high dynamic range (HDR) mode. The method 2000 is implemented by the computer system to generate the first fused image 518 in the HDR mode.

In some embodiments, the one or more geometric characteristics of the NIR image 504 and the RGB image 502 are manipulated by reducing a distortion level of at least a portion of the RGB and NIR images 502 and 504, implementing an image registration process to transform the NIR image 504 and the RGB image 502 into a coordinate system associated with the scene, or matching resolutions of the NIR image 504 and the RGB image 502.

In some embodiments, prior to decomposing the first NIR image 504' and decomposing the first RGB image 502', the computer system determines that the first RGB image 502' has a first radiance covering a first dynamic range and that the first NIR image 504' has a second radiance covering a second dynamic range. In accordance with a determination that the first dynamic range is greater than the second dynamic range, the computer system modifies the first NIR image 504' by mapping the second radiance of the first NIR image 504' to the first dynamic range. In accordance with a determination that the first dynamic range is less than the second dynamic range, the electronic device modifies the first RGB image 502' by mapping the first radiance of the first RGB image 502' to the second dynamic range.

In some embodiments, the set of weights includes a first weight, a second weight, a third weight and a fourth weight corresponding to the NIR base portion, NIR detail portion, RGB base portion and RGB detail portion, respectively. The second weight is greater than the fourth weight. Further, in some embodiments, the first NIR image 504' includes a region having details that need to be hidden, and the second weight corresponding to the NIR detail portion includes one or more weight factors corresponding to the region of the NIR detail portion. The computer system determines an image depth of the region of the first NIR image 504 and determines the one or more weight factors based on the image depth of the region of the first NIR image 504'. The one or more weight factors corresponding to the region of the first NIR image are less than a remainder of the second weight corresponding to a remaining portion of the NIR detail portion.

In some embodiments, the computer system tune color characteristics of the first fused image in the image domain. The color characteristics of the first fused image include at least one of color intensities and a saturation level of the first fused image 518. In some embodiments, in the image domain, the first fused image 518 is decomposed (2016) into a fused base portion and a fused detail portion, and the RGB image 502 is decomposed (2018) into a second RGB base portion and a second RGB detail portion. The fused detail portion and the second RGB base portion are combined (2016) to generate a second fused image. In some embodiments, one or more hazy zones are identified in the first fused image 518 or the second fused image, such that white balance of the one or more hazy zones is adjusted locally. Specifically, in some situations, the computer system detects one or more hazy zones in the first fused image 518, and identifies a predefined portion of pixels having minimum pixel values in each of the one or more hazy zones. The first fused image 518 is modified to a first image by locally saturating the predefined portion of pixels in each of the one or more hazy zones to a low-end pixel value limit. The first fused image 518 and the first image are blended to form a final fusion image 532. Alternatively, in some embodiments, one or more hazy zones are identified in the RGB image 502, such that white balance of the one or more hazy zones is adjusted locally by saturating a predefined portion of pixels in each hazy zone to the low-end pixel value limit.

Figure 21:
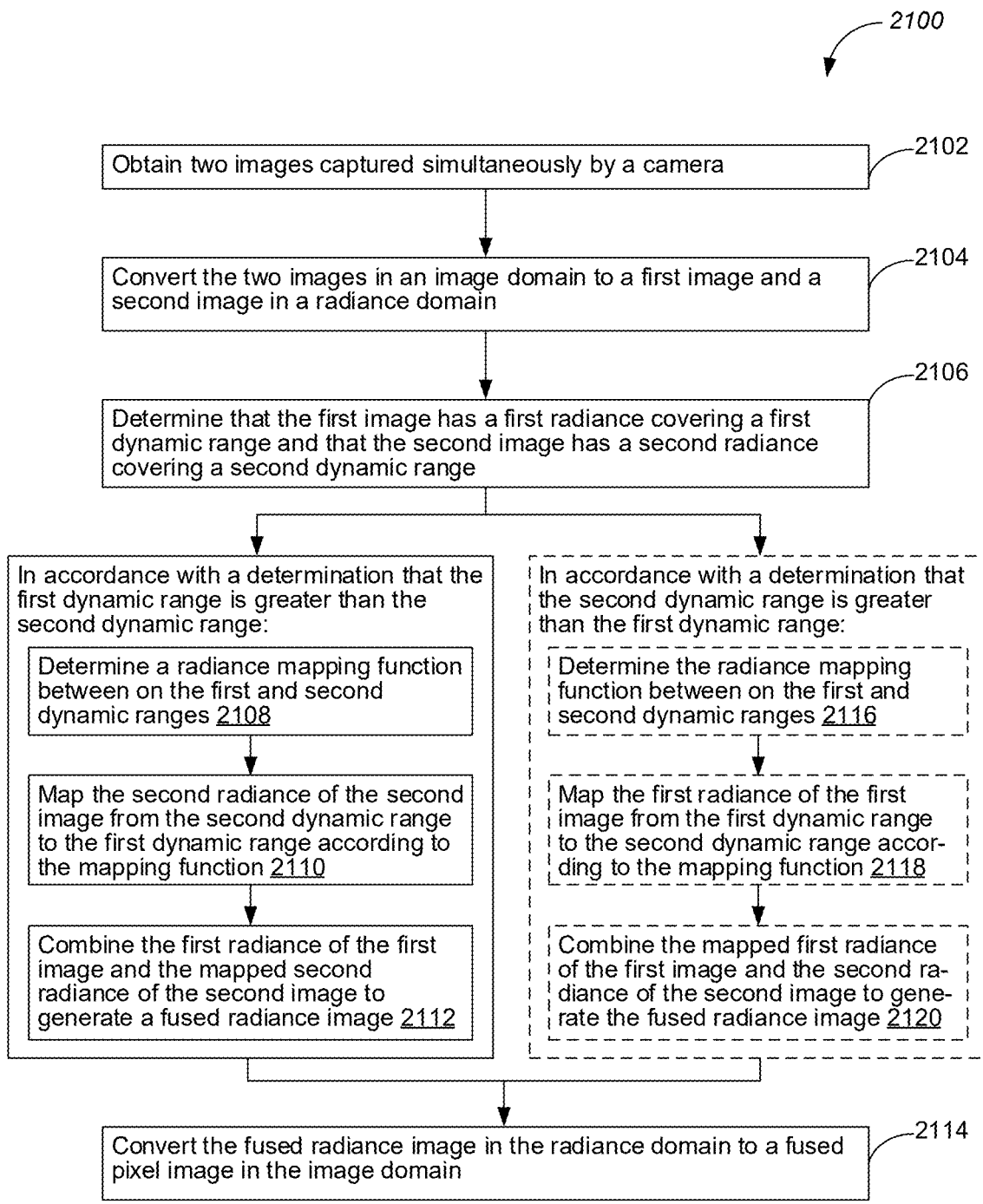
FIG. 21 is a flow diagram of an image fusion method implemented at a computer system, in accordance with some embodiments.

FIG. 21 is a flow diagram of an image fusion method 2100 implemented at a computer system 200 (e.g., a server 102, a client device, or a combination thereof), in accordance with some embodiments. Referring to both FIGS. 6 and 21, the computer system 200 obtains (2102) two images 602 and 604 captured simultaneously (e.g., by different image sensors of the same camera or two distinct cameras) and converts (2104) the two images 602 and 604 in an image domain to a first image 608 and a second image 610 in a radiance domain. In some embodiments, at least one of the two images 602 and 604 is equalized. The computer system 200 determines (2106) that the first image 608 has a first radiance covering a first dynamic range 612 and that the second image has a second radiance covering a second dynamic range 614. In accordance with a determination that the first dynamic range 612 is greater than the second dynamic range 614, the computer system 200 determines (2408) a radiance mapping function 618 between on the first and second dynamic ranges 612 and 614, maps (2110) the second radiance of the second image 610 from the second dynamic range 614 to the first dynamic range 612 according to the mapping function 618, and combines (2112) the first radiance of the first image 608 and the mapped second radiance of the second image 610 to generate a fused radiance image 620. In some embodiments, the fused radiance image is an average of the first radiance of the first image 608 and the mapped second radiance of the second image 610. The fused radiance image 620 in the radiance domain is converted (2114) to a fused pixel image 624 in the image domain.

In some embodiments, in accordance with a determination that the second dynamic range 614 is greater than the first dynamic range 612, the computer system 200 determines (2116) the radiance mapping function 618" between on the first and second dynamic ranges 612 and 614, maps (2118) the first radiance of the first image 608 from the first dynamic range 612 to the second dynamic range 614 according to the mapping function 618', and combines (2420) the mapped first radiance of the first image 608 and the second radiance of the second image 610 to generate the fused radiance image 620'.

In some embodiments, the first image 608 is converted from a color image (e.g., the RGB image 602) captured by the camera, and the first radiance of the first image 608 corresponds to an L* channel of the first image 608. The second image 610 is converted from the NIR image 604 captured by the camera, and the second radiance of the second image 610 corresponds to grayscale information of the second image 610 and is mapped to the first dynamic range 612 of the first image 608. In some embodiments not shown in FIG. 6, the first image 608 is converted from the NIR image 604 captured by the camera, and the first radiance of the first image 608 corresponds to grayscale information of the first image 608. The second image 610 is converted from a color image captured by the camera, and the second radiance of the second image 610 corresponds to an L* channel of the second image 610 and is mapped to the first dynamic range of the first image 608.

In some embodiments, the two images 602 and 604 are captured by a first image sensor and a second image sensor of the camera that correspond to the first image 608 and the second image 610, respectively. A first CRF 632 and a second CRF 634 are determined for the first image sensor and the image second sensor of the camera, respectively. The two images 602 and 604 are converted to the first and second images 608 and 610 in accordance with the first and second CRFs 632 and 634 of the camera, respectively. The fused radiance image 620 is converted to the fused pixel image 624 based on the first CRF 632 of the camera. Further, In some embodiments, the first and second CRFs 632 and 634 of the camera are determined by applying a plurality of exposure settings to the camera and in accordance with the plurality of exposure settings, capturing a set of CRF calibration images from which the first CRF 632 and the second CRF 634 are determined. Alternatively, in some embodiments, the first and second CRFs 632 and 634 of the camera are pre-calibrated with a predefined radiance of a luminaire, and the radiance mapping function 618 is determined based on the first and second CRFs 632 and 634 of the camera.

In some embodiments, in the image domain, the computer system 200 determines channel a* color information and channel b* color information for one of the two images 608 and 610 and greyscale information 626 of the fused pixel image 624. The channel a* color information, channel b* color information, and the greyscale information 626 are merged to generate the fused pixel image 624 with color. Further, in some embodiments, the fused pixel image 624 is equalized.

Figure 22:
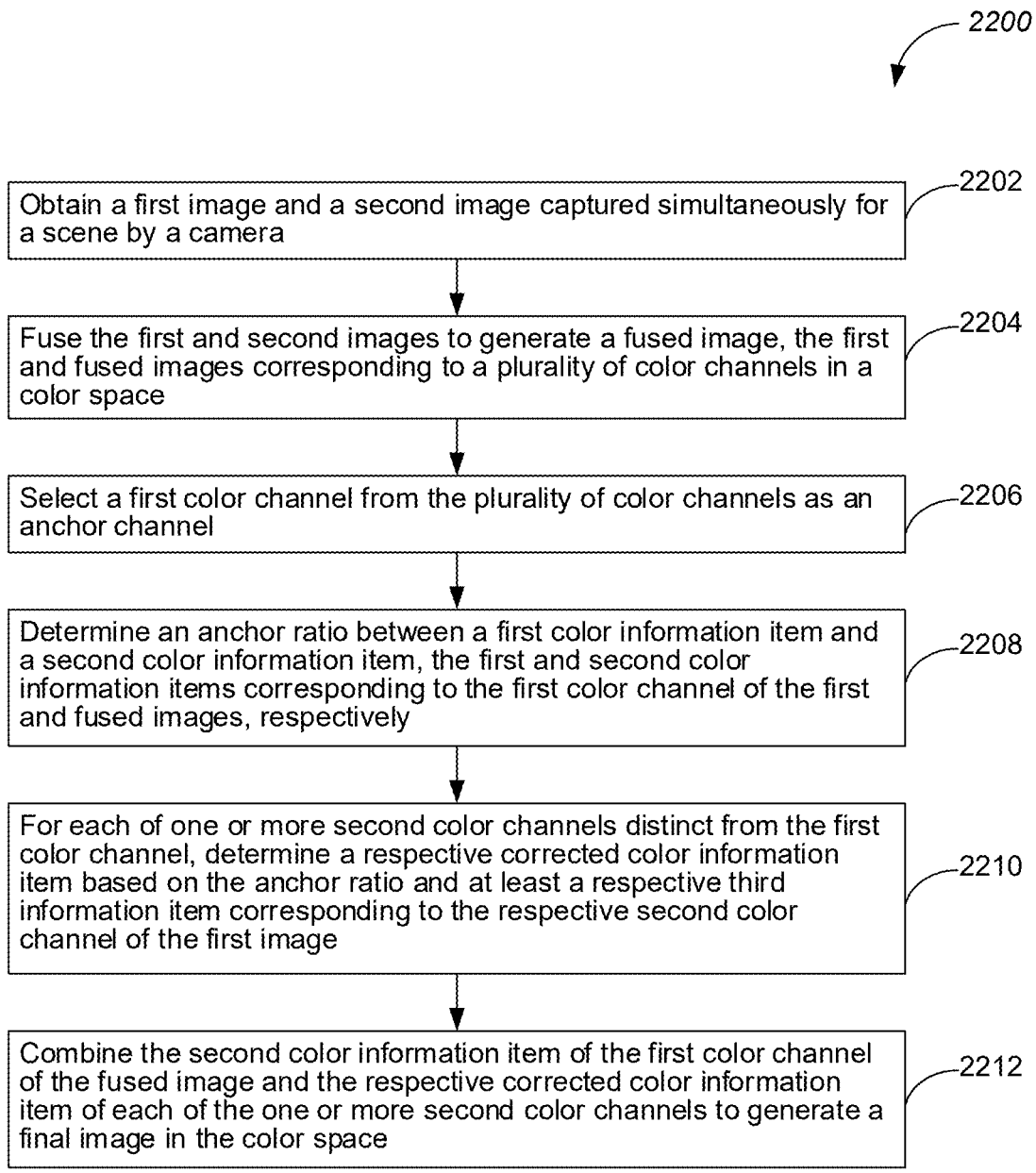
FIG. 22 is a flow diagram of an image processing method implemented at a computer system, in accordance with some embodiments.

FIG. 22 is a flow diagram of an image processing method 2200 implemented at a computer system 200 (e.g., a server 102, a client device, or a combination thereof), in accordance with some embodiments. Referring to both FIGS. 10 and 22, the computer system 200 obtains (2202) a first image 1004 (e.g., an RGB image) and a second image 1006 (e.g., an NIR image) captured simultaneously for a scene (e.g., by different image sensors of the same camera or two distinct cameras) and fuses (2204) the first and second images 1004 and 1006 to generate a fused image 1002. The first and fused images 1004 and 1002 correspond to a plurality of color channels in a color space. A first color channel is selected (2206) from the plurality of color channels as an anchor channel. The computer system 200 determines (2208) an anchor ratio between a first color information item and a second color information item. The first and second color information items corresponds to the first color channel of the first and fused images 1004 and 1002, respectively. For each of one or more second color channels distinct from the first color channel, a respective corrected color information item is determined (2210)) based on the anchor ratio and at least a respective third information item corresponding to the respective second color channel of the first image. The computer system 200 combines (2212) the second color information item of the first color channel of the fused image 1002 and the respective corrected color information item of each of the one or more second color channels to generate a final image 1020 in the color space.

In some embodiments, the anchor ratio and the respective corrected color information item of each second color channel are determined on a pixel basis, and the second color information item of the first color channel and the respective corrected color information items of the one or more second color channels are combined on the pixel basis.

In some embodiments, the first color channel is selected from the plurality of color channels according to an anchor channel selection criterion (i.e., for the entire fused image 1002). For example, in accordance with the anchor channel selection criterion, the anchor channel of the fused image has a smallest overall standard deviation with respect to a corresponding color channel of the first image among the plurality of color channels of the fused image.

In some embodiments, the respective corrected color information item is determined for each second color channel by determining a respective color ratio between the respective third information item of the first image 1004 and a respective fourth color information item corresponding to the respective second color channel of the fused image 1002 and combining the respective fourth color information item, the respective color ratio, and the anchor ratio to determine the respective corrected color information item for the respective second color channel. Alternatively, in some embodiments, the respective corrected color information item for each second color channel is determined by combining the respective third color information item of the first image and the anchor ratio to determine the respective corrected color information item for the respective second color channel.

In some embodiments, the plurality of color channels includes a red channel, a green channel, and a blue channel, and the anchor channel is one of the red, green and blue channels. The one or more second color channels includes two of the red, green and blue channels that are distinct from the anchor channel. Further, in some embodiments, the anchor channel is the green channel.

In some embodiments, referring to FIG. 10, the first and second images 1004 and 1006 are fused in a radiance domain. Specifically, the first and second images 1004 and 1006 are converted to the radiance domain. In the radiance domain, a first radiance of the first image 1004 and a second radiance of the second image 1006 are normalized based on a radiance mapping function. For example, one of the first and second radiances having a smaller dynamic range is converted to a greater dynamic range of the other of the first and second radiances. The first and second radiances of the first and second images 1004 and 1006 are combined to obtain a fused radiance image, which is converted to the fused image 1002 in the image domain. In some situations, the fused radiance image includes luminance or grayscale information of the first and second images, and is combined with color information of the first image (e.g., channel a* and b* information in a CIELAB color space) to obtain the fused image 1002.

Figure 23:
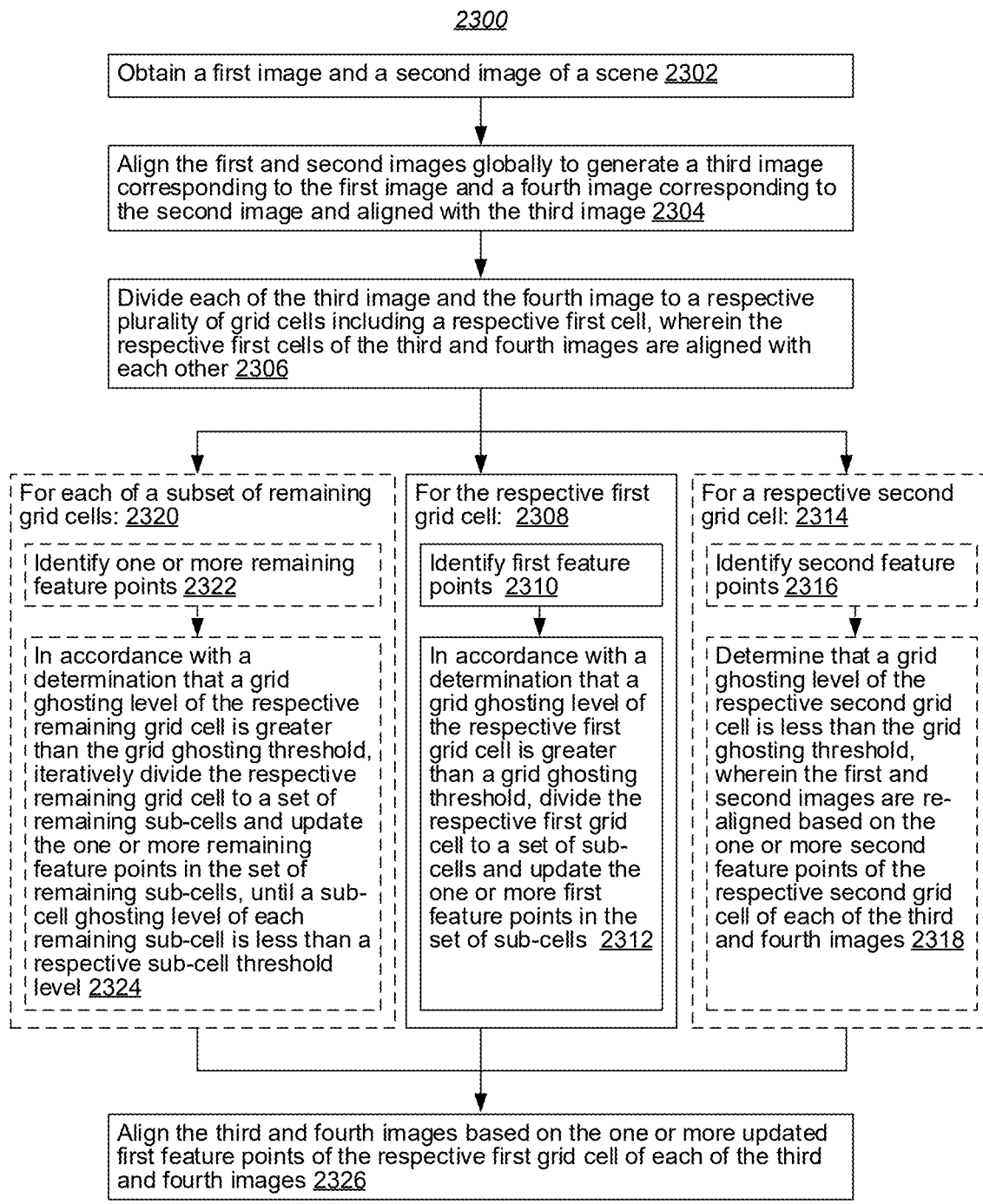
FIG. 23 is a flow diagram of an image registration method implemented at a computer system, in accordance with some embodiments.

FIG. 23 is a flow diagram of an image registration method 2300) implemented at a computer system 200 (e.g., a server 102, a client device, or a combination thereof), in accordance with some embodiments. Referring to FIGS. 11A-11C and 23, the computer system 200 obtains (2302) a first image 1102 and a second image 1104 of a scene. In some embodiments, the first image 1102 is an RGB image, and the second image 1006 is an NIR image that captured simultaneously with the RGB image (e.g., by different image sensors of the same camera or two distinct cameras). The first and second images 1102 and 1104 are globally aligned (2304) to generate a third image 1106 corresponding to the first image 1102 and a fourth image 1108 corresponding to the second image 1104 and aligned with the third image 1106. Each of the third image 1106 and the fourth image 1108 is divided (2306) to a respective plurality of grid cells 1112 or 1114 including a respective first grid cell 1112A or 1114A. The respective first grid cells 1112A and 1114 of the third and fourth images 1106 and 1108 are aligned with each other. For the respective first grid cell 1112A or 1114A of each of the third and fourth images 1106 and 1108 (2308), one or more first feature points 1122A or 1124A are identified (2310). In accordance with a determination that a grid ghosting level of the respective first grid cell 1112A or 1114A is greater than a grid ghosting threshold $V_{GTH}$, the respective first grid cell 1112A or 1114 is further divided (2312) to a set of sub-cells 1132A or 1134A and the one or more first feature points 1122A or 1124A are updated in the set of sub-cells 1132A or 1134A. The computer system 200 further aligns (2326) the third and fourth images 1106 and 1108 based on the one or more updated first feature points 1122A or 1124A of the respective first grid cell 1112A or 1114A of each of the third and fourth images 1106 and 1108.

In some embodiments, the plurality of grid cells 1112 or 1114 include (2314) a respective second gird cell 1112B or 1114B in the third image 1106 or fourth image 1108, respectively. The respective second grid cell 1112B or 1114B is distinct from the respective first grid cell 1112A or 1112A. One or more second feature points 1122B or 1124B are identified (2316) in the respective second grid cell 1112B or 1114B. The computer system 200 determines (2318) that a grid ghosting level of the respective second grid cell 1112B or 1114B is less than the grid ghosting threshold $V_{GTH}$. The first and second images 1102 and 1104 are re-aligned (2326) based on the one or more second feature points 1122B or 1124B of the respective second grid cell 1112B or 1114B of each of the third and fourth images 1106 and 1108.

In some embodiments, the plurality of grid cells 1112 or 1114 include (2320) a respective set of remaining grid cells 1112R or 1114R in the third image 1106 or fourth image 1108, respectively. The respective set of remaining grid cells 1112R or 1114R are distinct from and complimentary to the respective first grid cell 1112A or 1112A. The set of remaining grid cells 1112R or 1114R is scanned. For each of a subset of remaining grid cells 1112R or 1114R in the third and fourth images 1106 and 1108, the computer system 200 identifies (2322) one or more remaining feature points 1122R or 1124R. For each of the subset of remaining grid cell 1112R or 1114R (2320), in accordance with a determination that a grid ghosting level of the respective remaining grid cell is greater than the grid ghosting threshold, the computer system 200 iteratively divides (2324) the respective remaining grid cell 1112R or 1114 to a set of remaining sub-cells 1132R or 1134R and updates the one or more remaining feature points 1122R and 1124R in the set of remaining sub-cells 1132R or 1134R, until a sub-cell ghosting level of each remaining sub-cell 1132R or 1134R is less than a respective sub-cell ghosting threshold.

In some embodiments, the first and second images 1102 and 1104 are aligned globally based on a transformation function. The transformation function is updated based on the one or more updated first feature points 1122A or 1124A of the respective first grid cell 1112A or 1114B of each of the third and fourth images 1106 and 1108. The third and fourth images 1106 and 1108 are further aligned (2326) based on the updated transformation function.

In some embodiments, the one or more updated first feature points 1122A and 1124A include a subset of the one or more first feature points 1122A and 1124A, one or more additional feature points in the set of the sub-cells 1132A and 1134A, or a combination thereof. Each of the one or more additional feature points is distinct from any of the one or more first feature points 1122A and 1124A.

In some embodiments, the computer system 200 determines the grid ghosting level of the respective first grid cell 1112A or 1114A of each of the third and fourth images 1106 and 1108 based on the one or more first feature points 1122A or 1124A. The grid ghosting level of the first grid cell 1112A or 1114A is compared with the grid ghosting threshold $V_{GTH}$.

In some embodiments, the computer system 200 align (2304) the first and second images 1102 and 1104 globally by identifying one or more global feature points each of which is included in both the first and second images 1102 and 1104 and transforming at least one of the first and second images 1102 and 1104 to align the one or more global feature points in the first and second images 1102 and 1104. In some embodiments, the third image 1106 is identical to the first image 1102 and is applied as a reference image, and the first and second images 1102 and 1104 are aligned (2304) globally by transforming the second image 1104 to the fourth image 1108 with reference to the first image 1102.

In some embodiments, the computer system 200 determines a range of an image depth for the first and second images 1102 and 1104 and determines whether the range of the image depth exceeds a threshold range. Each of the third and fourth images 1106 and 1108 is divided to the plurality of grid cells 1112 or 1114 in accordance with a determination that the range of the image depth exceeds the threshold range.

Figure 24:
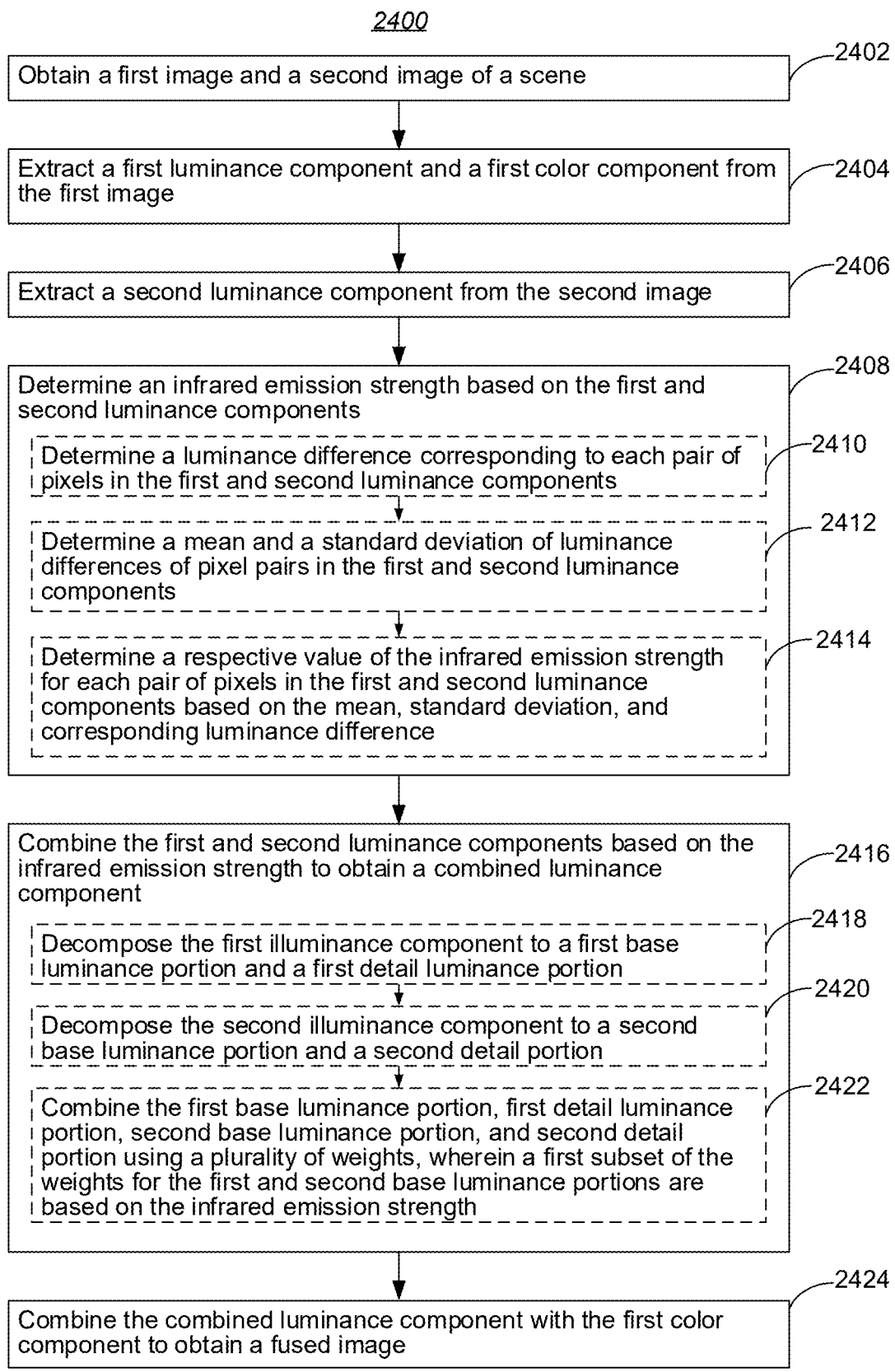
FIG. 24 is a flow diagram of another image processing method implemented at a computer system, in accordance with some embodiments.

FIG. 24 is a flow diagram of another image processing method 2400) implemented at a computer system 200 (e.g., a server 102, a client device, or a combination thereof), in accordance with some embodiments. Referring to FIGS. 14 and 24, the computer system 200 obtains (2402) a first image 1402 and a second image 1404 of a scene. In some embodiments, the second image 1404 is monochromatic, and does not include any color component. In an example, the second image 1404 includes an NIR image. The computer system extracts (2404) a first luminance component 1408 and a first color component 1410 from the first image 1402, and extracts (2406) a second luminance component 1412 from the second image 1404. An infrared emission strength ε is determined (2408) based on the first and second luminance components 1408 and 1412. In some embodiments, the infrared emission strength ε includes a respective value $ε_i$ for each pixel of the first image 1402. A luminance difference $δ_i$ is determined (2410)) for each pair of pixels in the first and second luminance components 1408 and 1412. The computer system 200 then determines (2412) a mean u and a standard deviation σ of luminance differences $δ_i$ of pixel pairs in the first and second luminance components 1408 and 1412. The respective value $ε_i$ of the infrared emission strength is determined (2414) for each pair of pixels in the first and second luminance components 1408 and 1412 based on the mean μ, standard deviation σ, and corresponding luminance difference $δ_i$. Further, in some embodiments, the respective value $ε_i$ of the infrared emission strength is normalized for each pair of pixels in the first and second luminance components 1408 and 1412 with reference to a maximum value $ε_{max}$ of the respective values of the infrared emission strength for the first and second luminance components 1408 and 1412.

The computer system combines (2416) the first and second luminance components 1408 and 1412 based on the infrared emission strength ε to obtain a combined luminance component 1418, which is further combined (2424) with the first color component 1410 to obtain a fused image 1422. In some embodiments, the computer system 200 combines the first and second luminance components 1408 and 1412 by decomposing (2418) the first illuminance component 1408 to a first base luminance portion $b_{rgb}$ and a first detail luminance portion $d_{rgb}$ and decomposing (2420) the second illuminance component 1412 to a second base luminance portion $b_{nir}$ and a second detail luminance portion $d_{nir}$. Each base or detail portion corresponds to low-frequency or high-frequency information of the corresponding luminance component, respectively, and can be generated based on a Laplacian pyramid. The first base luminance portion $b_{rgb}$, first detail luminance portion $d_{rgb}$, second base luminance portion $b_{nir}$, and second detail portion $d_{nir}$ are combined (2422) using a plurality of weights. A first subset of the weights for the first and second base luminance portions 1408 and 1412 are based on the infrared emission strength ε. Alternatively, in some embodiments, the first and second base luminance portions $b_{rgb}$ and $b_{nir}$ are combined to a combined base portion using a set of base weights. The first and second detail luminance portions $d_{rgb}$ and $d_{nir}$ are combined to a combined detail portion using a set of detail weights. The combined base and detail portions are further combined to the combined luminance component 1418. Further, in some embodiments, the set of base weights are generated based on the infrared emission strength ε. Optionally, the set of detail weights are independently of the infrared emission strength or based on the infrared emission strength.

In some embodiments, the first image includes an RGB image. The first luminance component 1408 is extracted from an L* channel of the RGB image in a CIELAB color space. The first color component 1410 is extracted from an a* channel and an b* channel of the RGB image in the CIELAB color space. Alternatively, in some embodiments, the first luminance component 1408 is extracted from a luminance-based channel in one of HSV, HSL, and LUV color spaces, and the first color component 1410 is extracted from one or more color-based channels in the one of HSV, HSL, and LUV color spaces.

Figure 25:
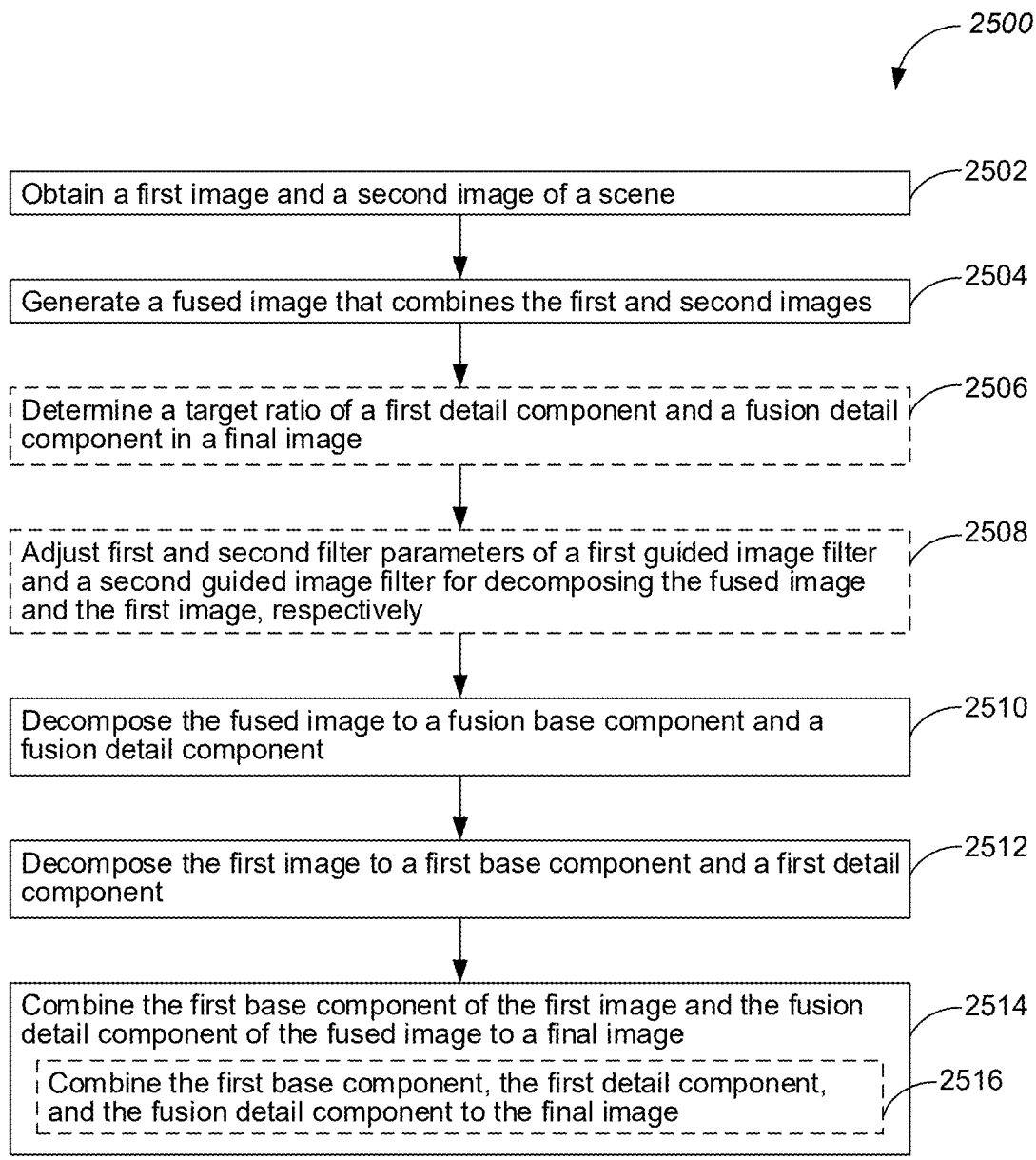
FIG. 25 is a flow diagram of another image processing method implemented at a computer system, in accordance with some embodiments.

FIG. 25 is a flow diagram of another image processing method 2500) implemented at a computer system 200 (e.g., a server 102, a client device, or a combination thereof), in accordance with some embodiments. Referring to FIGS. 16 and 25, the computer system 200 obtains (2502) a first image 1602 and a second image 1604 of a scene. In some embodiments, the first image 1602 includes an RGB image, and the second image 1604 includes an NIR image. The RGB image and the NIR image are captured in a synchronous manner (e.g., by different image sensors of the same camera or two distinct cameras). A fused image 1606 is generated (2504) by combining the first and second images 1602 and 1604. The computer system 200 decomposes (2510) the fused image 1606 to a fusion base component $b_{fusion}$ and a fusion detail component $d_{fusion}$, and decomposes (2512) the first image to a first base component $b_{rgb}$ and a first detail component $d_{rgb}$. The first base component $b_{rgb}$ of the first image 1602 and the fusion detail component $d_{fusion}$ of the fused image 1606 are combined (2514) to a final image 1614.

In some embodiments, the first detail component $d_{rgb}$ is also combined into the final image 1614, i.e., the first base component $b_{rgb}$, the first detail component $d_{rgb}$, and the fusion detail component $d_{fusion}$ are combined (2516) to the final image 1614. Further, in some embodiments, the fused image 1606 is decomposed using a first guided image filter having first filter parameters, and the first image is decomposed using a second guided image filter having second filter parameters. The computer system 200 determines (2506) a target ratio of the first detail component $d_{rgb}$ and the fusion detail component $d_{fusion}$. The first and second filter parameters are adjusted (2508) based on the target ratio. When the first base component $b_{rgh}$, the first detail component $d_{rgb}$, and the fusion detail component $d_{fusion}$ are generated by the guided image filters, they comply with the target ratio and result in the final image 1614 as intended.

In some embodiments, the fused image 1606 has a first haze level and a first dynamic range, and the final image 1614 has a second haze level and a second dynamic range. The second haze level is lower than the first haze level, and the second dynamic range is greater than the first dynamic range.

Figure 26:
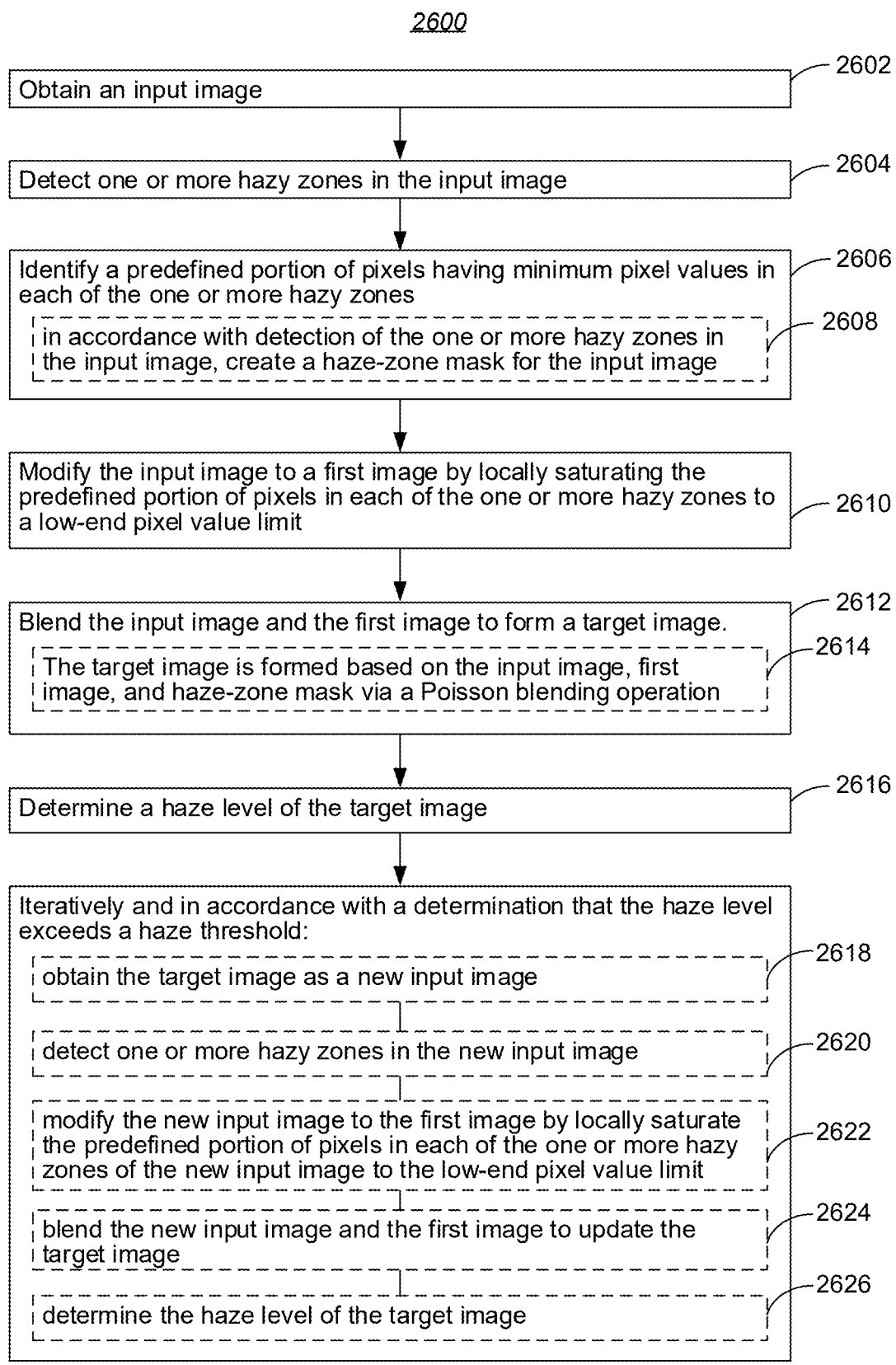
FIG. 26 is a flow diagram of another image processing method implemented at a computer system, in accordance with some embodiments.

FIG. 26 is a flow diagram of another image processing method 2600 implemented at a computer system 200 (e.g., a server 102, a client device, or a combination thereof), in accordance with some embodiments. Referring to FIGS. 18A and 26, the computer system 200 obtains (2602) an input image 1802. The computer system 200 detects (2604) one or more hazy zones 1804 in the input image 1802, and identifies (2606) a predefined portion of pixels having minimum pixel values in each of the one or more hazy zones 1804. In some embodiments, in accordance with detection of the one or more hazy zones in the input image, the computer system 200 creates (2608) a haze-zone mask 1810 for the input image 1802. The input image 1802 is modified (2610) to a first image 1814 by locally saturating the predefined portion of pixels in each of the one or more hazy zones 1804 to a low-end pixel value limit. The input image 1802 and the first image 1814 are blended (2612) to form a target image 1806. In some embodiments, the target image 1806 is formed (2614) based on the input image 1802, first image 1814, and haze-zone mask 1810 via a Poisson blending operation.

In some embodiments, the target image 1806 is an intermediate target image 1818. The computer system 200 determines (2616) a haze level of the intermediate target image 1818. Iteratively and in accordance with a determination that the haze level exceeds a haze threshold, the computer system 200 obtains (2618) the intermediate target image 1818 as a new input image 1802, detects (2620) one or more hazy zones 1804 in the new input image 1802, modifies (2622) the new input image 1802 to the first image 1814 by locally saturates the predefined portion of pixels in each of the one or more hazy zones 1804 of the new input image 1802 to the low-end pixel value limit, blends (2624) the new input image 1802 and the first image 1814 to update the intermediate target image, and determines (2626) the haze level of the intermediate target image 1818. In accordance with a determination that the haze level does not exceed the haze threshold, the intermediate target image 1818 is finalized as the target image 1806.

In some embodiments, the computer system 200 generates a transmission map of the input image 1802, and identifies the one or more hazy zones 1804 based on the transmission map. In some embodiments, an RGB image and an NIR image are captured in a synchronous manner (e.g., by different image sensors of the same camera or two distinct cameras). The RGB image and NIR image are fused to create the input image 1802. In some embodiments, a subset of pixels having maximum pixel values are preserved in the input image 1802, thereby keeping a color temperature of the input image 1802. In some embodiments, the input image 1802 is one of a monochromatic image, an RGB color image, and an NIR image. In some embodiments, the low-end pixel value limit is equal to 0. In some embodiments, the predefined portion of pixels is equal to or less than 5% of each hazy zone 1804. In some embodiments, the predefined portion of pixels is equal to or less than 0.01% of each hazy zone 1804.

It should be understood that the particular order in which the operations in each of FIGS. 20-26 have been described are merely exemplary and are not intended to indicate that the described order is the only order in which the operations could be performed. One of ordinary skill in the art would recognize various ways to process images as described in this application. Additionally, it should be noted that details described above with respect to FIGS. 5-19 are also applicable in an analogous manner to each of the methods 2000, 2100, 2200, 2300, 2400, 2500, and 2600 described above with respect to FIGS. 20-26. For brevity, these details are not repeated for every figure in FIG. 20-26.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various embodiments and to best utilize the underlying principles and various embodiments with various modifications as are suited to the particular use contemplated. Therefore, it is to be understood that the scope of claims is not to be limited to the specific examples of the embodiments disclosed and that modifications and other embodiments are intended to be included within the scope of the appended claims.

What is claimed is:

1. A method for image fusion, comprising:
    obtaining a near infrared (NIR) image and an RGB image captured simultaneously in a scene;
    normalizing one or more geometric characteristics of the NIR image and the RGB image;
    converting the normalized NIR image to a first NIR image in a radiance domain and converting the normalized RGB image to a first RGB image in the radiance domain;
    decomposing the first NIR image to an NIR base portion and an NIR detail portion in the radiance domain, and decomposing the first RGB image to an RGB base portion and an RGB detail portion in the radiance domain;
    generating a weighted combination of the NIR base portion, the RGB base portion, the NIR detail portion, and the RGB detail portion in the radiance domain using a set of weights; and
    converting the weighted combination in the radiance domain to a first fused image in an image domain.

2. The method of claim 1, further comprising:
    determining a camera response function (CRF) of a camera;
    wherein the normalized NIR image and the normalized RGB image are converted to the first NIR image and the first RGB image in accordance with the CRF of the camera, and the weighted combination is converted to the first fused image in accordance with the CRF of the camera.

3. The method of claim 1, wherein:
    the set of weights includes a first weight corresponding to the NIR base portion, a second weight corresponding to the NIR detail portion, a third weight corresponding to the RGB base portion, and a fourth weight corresponding to the RGB detail portion; and
    the second weight is greater than the fourth weight.

4. The method of claim 3, wherein the first NIR image includes a region having details that need to be hidden, and the second weight corresponding to the NIR detail portion includes one or more weight factors corresponding to the region of the NIR detail portion, the method further comprising:
    determining an image depth of the region of the first NIR image; and
    determining the one or more weight factors based on the image depth of the region of the first NIR image, wherein the one or more weight factors corresponding to the region of the first NIR image are less than a remainder of the second weight corresponding to a remaining portion of the NIR detail portion.

5. The method of claim 1, wherein normalizing the one or more geometric characteristics of the NIR image and the RGB image comprises one or more of:
    reducing a distortion level of at least a portion of the RGB image and the NIR image;
    implementing an image registration process to transform the NIR image and the RGB image into a coordinate system associated with the scene; and
    matching resolutions of the NIR image and the RGB image.

6. The method of claim 1, further comprising:
    tuning color characteristics of the first fused image in the image domain, the color characteristics of the first fused image including at least one of color intensities and a saturation level of the first fused image.

7. The method of claim 6, wherein tuning the color characteristics of the first fused image in the image domain comprises:
    in the image domain, decomposing the first fused image into a fused base portion and a fused detail portion, and decomposing the RGB image into a second RGB base portion and a second RGB detail portion; and
    combining the fused detail portion and the second RGB base portion to generate a second fused image.

8. The method of claim 6, further comprising:
    identifying one or more hazy zones in the first fused image; and
    adjusting white balance of the one or more hazy zones locally.

9. The method of claim 1, further comprising:
    identifying one or more hazy zones in the RGB image; and
    adjusting white balance of the one or more hazy zones locally.

10. The method of claim 1, wherein the method is implemented by a computer system that operates in a high dynamic range (HDR) mode, and the first fused image is generated in in the HDR mode.

11. The method of claim 1, wherein the NIR image has a first resolution, and the RGB image has a second resolution, and the method further comprises:
    upscaling the first fused image to a larger resolution of the first resolution and the second resolution using Laplacian Pyramid.

12. The method of claim 1, wherein the first RGB image has a first radiance covering a first dynamic range and the first NIR image has a second radiance covering a second dynamic range, the method further comprising, prior to decomposing the first NIR image and decomposing the first RGB image:
    in accordance with a determination that the first dynamic range is greater than the second dynamic range, modifying the first NIR image by mapping the second radiance of the first NIR image to the first dynamic range; and in accordance with a determination that the first dynamic range is less than the second dynamic range, modifying the first RGB image by mapping the first radiance of the first RGB image to the second dynamic range.

13. The method of claim 1, wherein the RGB image and the first fused image each correspond to a plurality of color channels in a color space, the method further comprising:

selecting a first color channel from the plurality of color channels as an anchor channel;

determining an anchor ratio between a first color information item and a second color information item, wherein the first color information item corresponds to the first color channel of the first RGB image, and the second color information item corresponds to the first color channel of the first fused image;

for each of one or more second color channels distinct from the first color channel, determining a respective corrected color information item based on the anchor ratio and at least a respective third information item corresponding to the respective second color channel of the first RGB image; and combining the second color information item of the first color channel of the first fused image and the respective corrected color information item of each of the one or more second color channels to generate a third fused image.

14. The method of claim 1, wherein the first NIR image includes an NIR luminance component, and the first RGB image includes an RGB luminance component, the method further comprising:

determining an infrared emission strength based on the NIR luminance component and the RGB luminance component, and generating at least one of the set of weights based on the infrared emission strength, such that the NIR luminance component and the RGB luminance component are combined based on the infrared emission strength.

15. The method of claim 1, further comprising:

detecting one or more hazy zones in the first fused image;

identifying a predefined portion of pixels having minimum pixel values in each of the one or more hazy zones;

modifying the first fused image to a first image by locally saturating the predefined portion of pixels in each of the one or more hazy zones to a low-end pixel value limit; and blending the first fused image and the first image to form a final fusion image.

16. A method for image fusion, comprising:

obtaining a first image and a second image captured simultaneously in a scene by two distinct image sensors;

normalizing one or more geometric characteristics of the first image and the second image;

converting the normalized first image to a third image in a radiance domain and converting the normalized second image to a fourth image in the radiance domain;

decomposing the third image to a first base portion and a first detail portion in the radiance domain, and decomposing the fourth image to a second base portion and a second detail portion in the radiance domain;

generating a weighted combination of the first base portion, the first detail portion, the second base portion, and the second detail portion using a set of weights; and converting the weighted combination in the radiance domain to a first fused image in an image domain.

17. A computer system, comprising:

one or more processors; and a memory having instructions stored thereon, which when executed by the one or more processors cause the one or more processors to:

obtain a near infrared (NIR) image and an RGB image captured simultaneously in a scene;

normalize one or more geometric characteristics of the NIR image and the RGB image;

convert the normalized NIR image to a first NIR image in a radiance domain and convert the normalized RGB image to a first RGB image in the radiance domain;

decompose the first NIR image to an NIR base portion and an NIR detail portion in the radiance domain, and decompose the first RGB image to an RGB base portion and an RGB detail portion in the radiance domain;

generate a weighted combination of the NIR base portion, the RGB base portion, the NIR detail portion, and the RGB detail portion in the radiance domain using a set of weights; and convert the weighted combination in the radiance domain to a first fused image in an image domain.

18. The computer system of claim 17, wherein the instructions further cause the one or more processors to:

determine a camera response function (CRF) of a camera;

wherein the normalized NIR image and the normalized RGB image are converted to the first NIR image and the first RGB image in accordance with the CRF of the camera, and the weighted combination is converted to the first fused image in accordance with the CRF of the camera.

19. The computer system of claim 17, wherein:

the set of weights includes a first weight corresponding to the NIR base portion, a second weight corresponding to the NIR detail portion, a third weight corresponding to the RGB base portion, and a fourth weight corresponding to the RGB detail portion; and the second weight is greater than the fourth weight.

20. A non-transitory computer-readable medium, having instructions stored thereon which, when executed by one or more processors, cause the one or more processors to perform the method of claim 1.

* * * * *